United States Patent
Yamagishi

(10) Patent No.: US 8,000,222 B2
(45) Date of Patent: Aug. 16, 2011

(54) WIRELESS COMMUNICATION DEVICE ADOPTING OFDM MODULATION

(75) Inventor: Toshiyuki Yamagishi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 12/407,270

(22) Filed: Mar. 19, 2009

(65) Prior Publication Data

US 2009/0274039 A1    Nov. 5, 2009

(30) Foreign Application Priority Data

Apr. 30, 2008    (JP) .................... 2008-118881

(51) Int. Cl.
*H04J 13/16*    (2011.01)
(52) U.S. Cl. .................. 370/207; 370/208; 370/210
(58) Field of Classification Search ........... 370/203–211
See application file for complete search history.

(56) References Cited

U.S. PATENT DOCUMENTS

| | | | | |
|---|---|---|---|---|
| 6,384,756 B1* | 5/2002 | Tajiri et al. | ........... | 341/120 |
| 6,700,515 B2* | 3/2004 | Asami | ........... | 341/120 |
| 7,724,162 B2* | 5/2010 | Van de Sande et al. | ........... | 341/61 |
| 2007/0071137 A1* | 3/2007 | McCorkle | ........... | 375/332 |

FOREIGN PATENT DOCUMENTS

| | | |
|---|---|---|
| JP | 2000-346913 | 12/2000 |
| JP | 2002-71723 | 3/2002 |
| JP | 2005-286910 | 10/2005 |

* cited by examiner

*Primary Examiner* — Ricky Ngo
*Assistant Examiner* — Ben H Liu
(74) *Attorney, Agent, or Firm* — Oblon, Spivak, McClelland, Maier & Neustadt, L.L.P.

(57) ABSTRACT

A wireless communication device includes a converting circuit, a discrete Fourier transformer, a separating circuit, a correcting unit. The converting circuit converts an analog signal having an in-phase component and a quadrature component into a digital signal having a real part and an imaginary part of complex number respectively. The discrete Fourier transformer converts the real part and the imaginary part of the digital signal obtained in the converting circuit from a time domain to a frequency domain. The separating circuit separates the digital signal into a first sum of a symmetrical component of the real part and an antisymmetrical component of the imaginary part of the digital signal and a second sum of the antisymmetrical component of the real part and the symmetrical component of the imaginary part of the digital signal. The correcting unit corrects a value of the second sum.

20 Claims, 12 Drawing Sheets

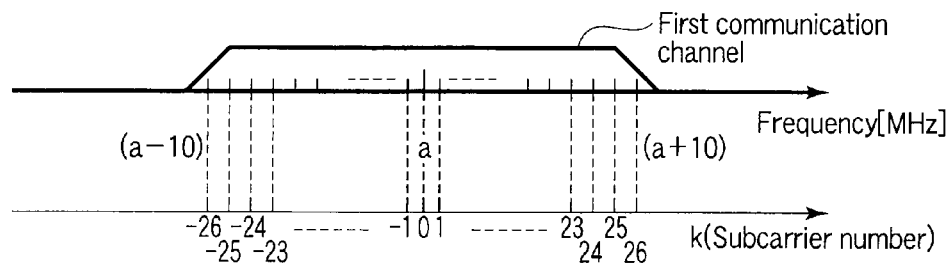
F I G. 4
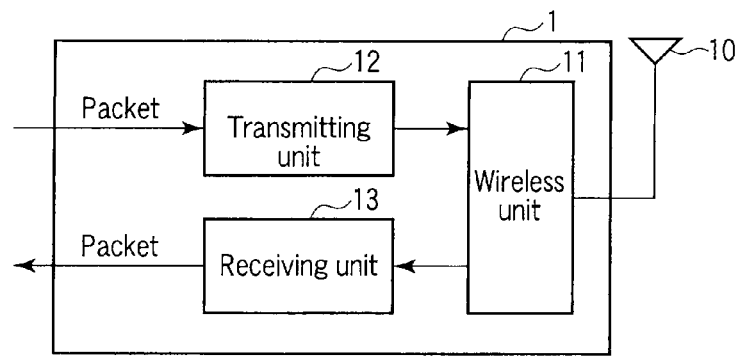
F I G. 5
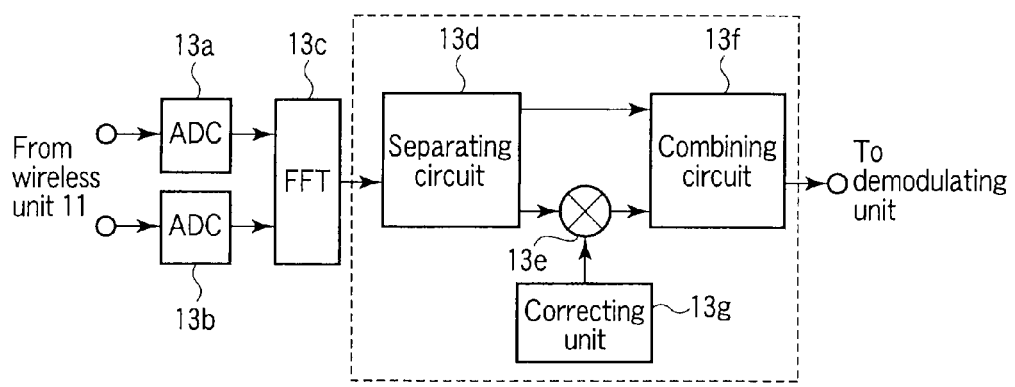
F I G. 6

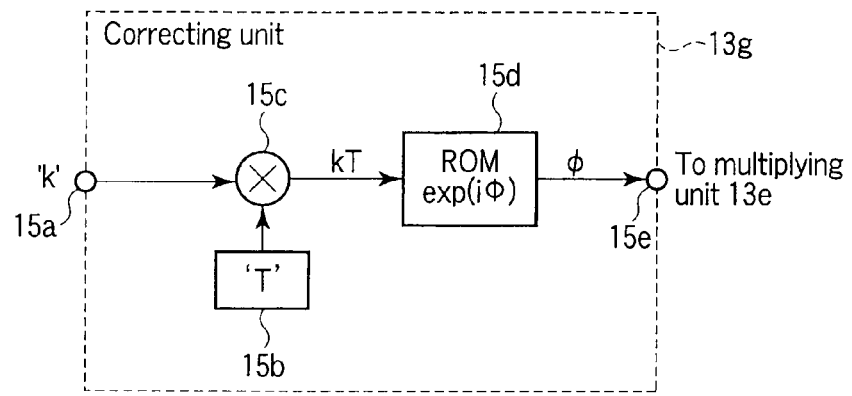
F I G. 8
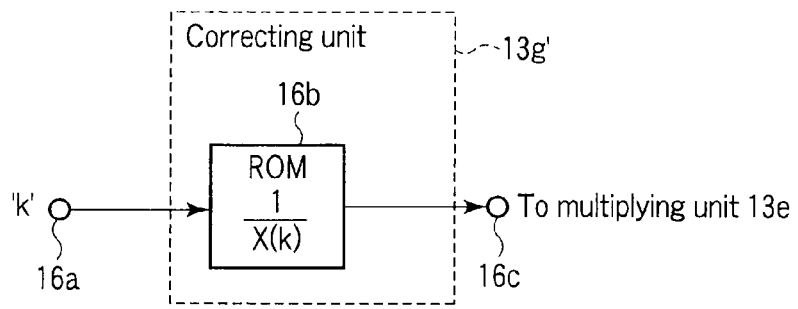
F I G. 9
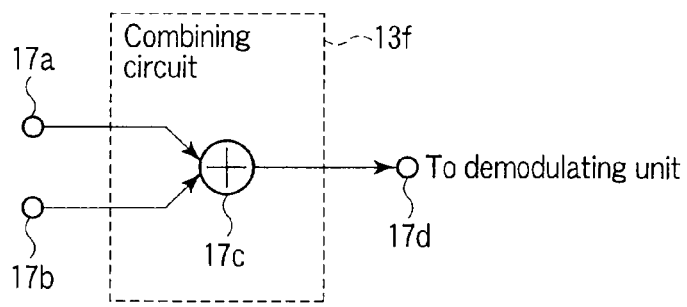
F I G. 10

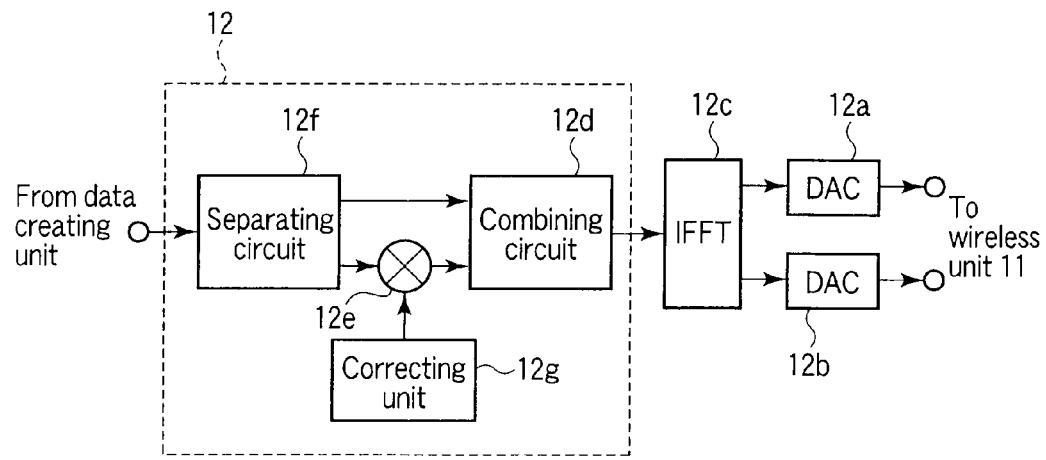
F I G. 11
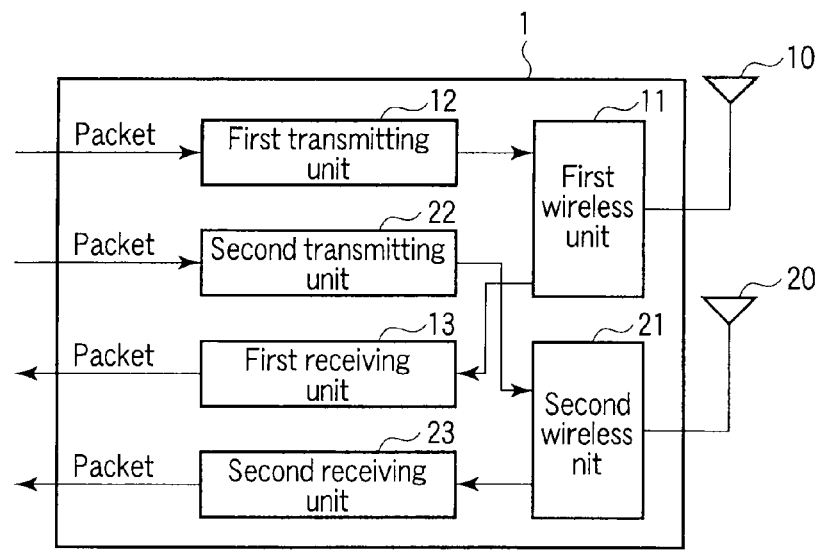
F I G. 12

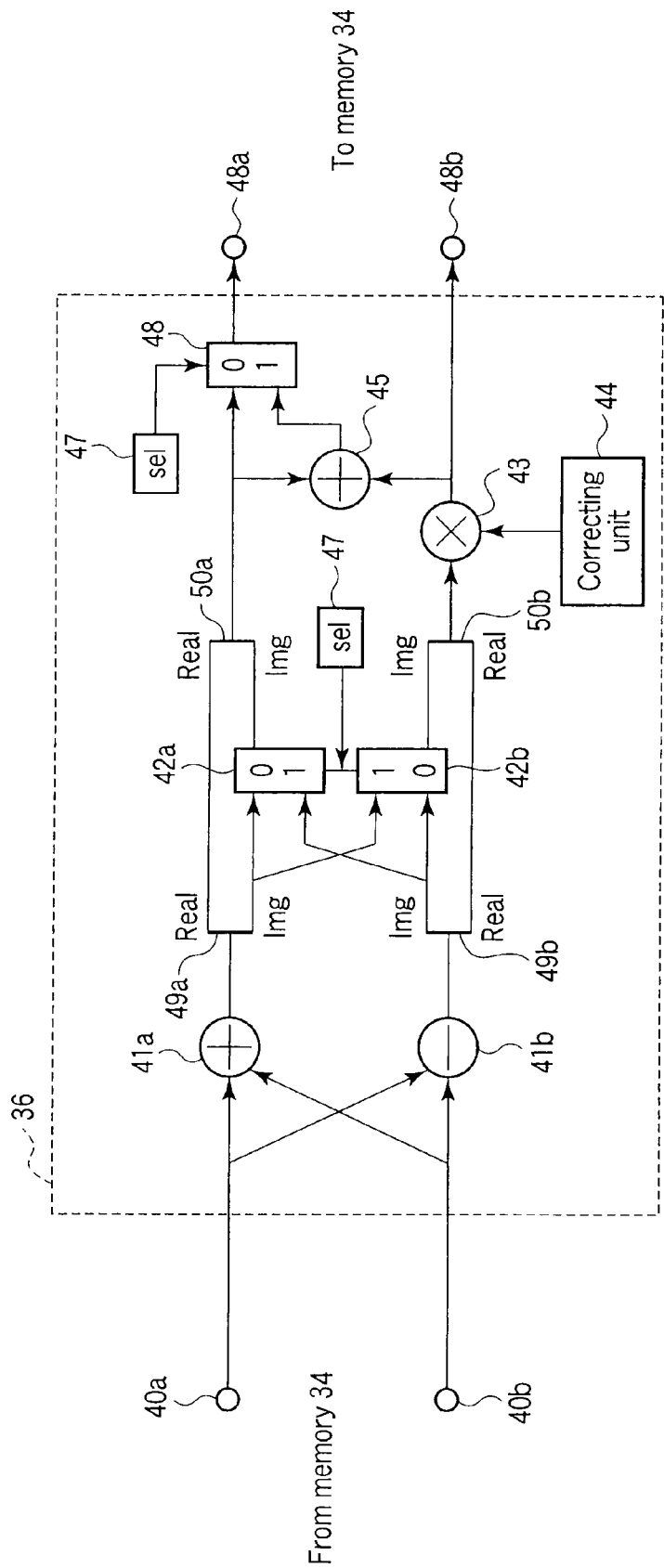
F I G. 15

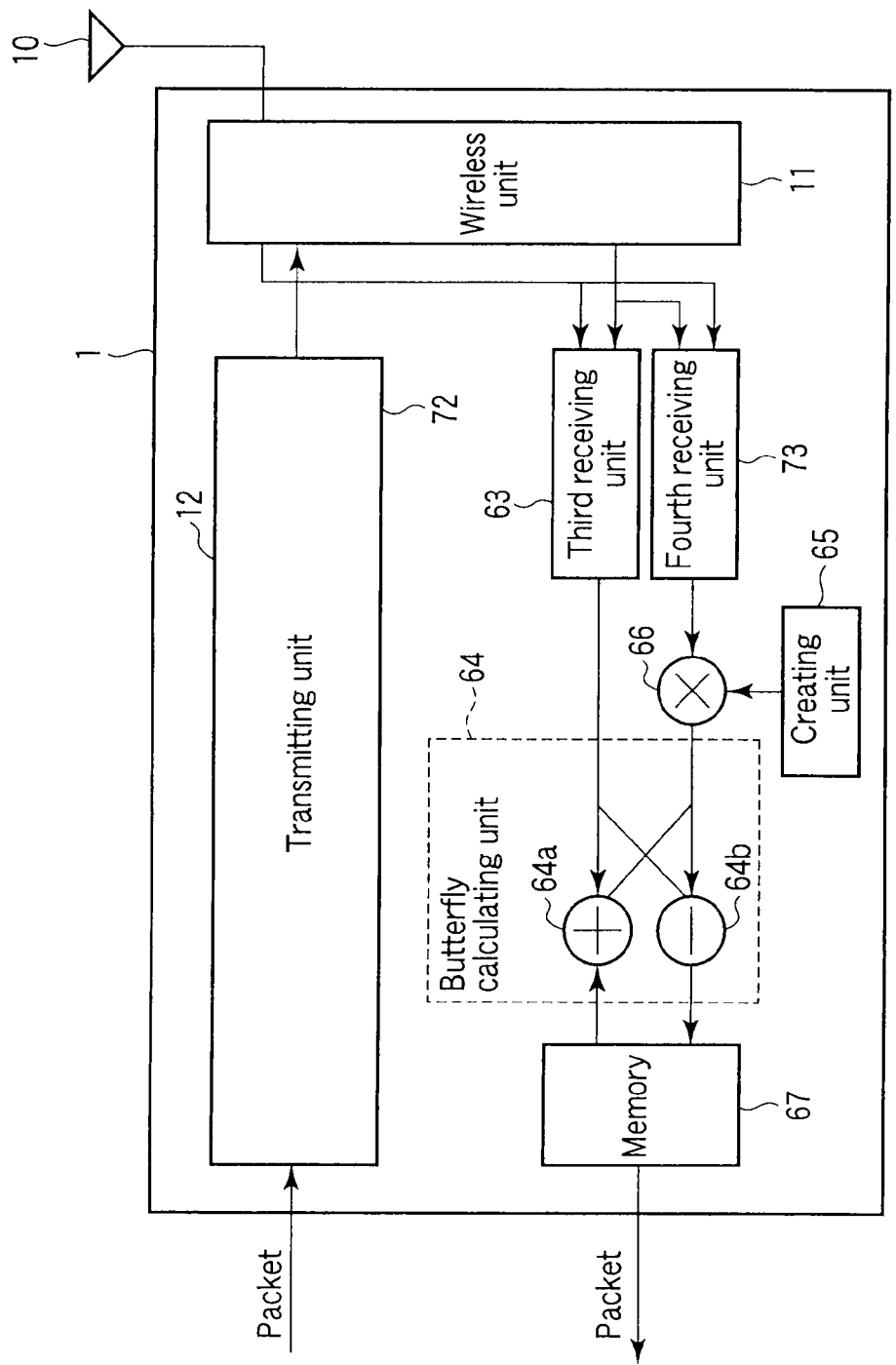
F I G. 19

WIRELESS COMMUNICATION DEVICE ADOPTING OFDM MODULATION

CROSS-REFERENCE TO RELATED APPLICATIONS

This application is based upon and claims the benefit of priority from prior Japanese Patent Application No. 2008-118881, filed Apr. 30, 2008, the entire contents which are incorporated herein by reference.

BACKGROUND OF THE INVENTION

1. Field of the Invention

The present invention relates to a wireless communication device. For example, the invention relates to correction of a sampling timing in a wireless communication device which adopts an OFDM modulation.

2. Description of the Related Art

Generally, a sampling timing deviation which occurs when converting analog signals having quadrature components and in-phase components into digital signals is not an important problem in a properly designed analog circuit. When realizing a wireless communication device using a UWB (Ultra Wide Band) and a broadband frequency such as millimeter wave, however, the above deviation becomes a serious problem according as the circuit becomes a higher integration level and it achieves a lower power consumption, and further according to the speeding up of the sampling timing caused by the use of a broadband frequency.

In other words, with the advent of wireless communication using a broadband frequency, it is supposed that only a design of an analog circuit cannot cope with the correction of the timing deviation in the future.

Taking the above into consideration, Jpn. Pat. Appln. KOKAI Publication No. 2000-346913 discloses the technique in which the above-mentioned deviation at the sampling timing is solved by adjusting a tap coefficient with a digital filter.

BRIEF SUMMARY OF THE INVENTION

A wireless communication device according to an aspect of the present invention includes a converting circuit which converts an analog signal having an in-phase component and a quadrature component and supplied from an antenna into a digital signal having a real part and an imaginary part of complex number respectively;
a discrete Fourier transformer which converts the real part and the imaginary part of the digital signal obtained in the converting circuit from a time domain to a frequency domain;
a separating circuit which separates the digital signal converted to the frequency domain by the discrete Fourier transformer into a sum of a symmetrical component of the real part and an antisymmetrical component of the imaginary part of the digital signal and a sum of the antisymmetrical component of the real part and the symmetrical component of the imaginary part of the digital signal; and
a correcting unit which corrects a value of the sum of the antisymmetrical component of the real part and the symmetrical component of the imaginary part created in the separating circuit, according to a deviation of the imaginary part from the real part at sampling timing occurring at analog-digital conversion in the converting circuit or a deviation of amplitude and phase between the real part and the imaginary part occurring across the antenna to the converting circuit.

A wireless communication device according to an aspect of the present invention includes a separating circuit which separates a digital signal including a real part component and an imaginary part component of complex number in a frequency domain into a sum of the symmetrical component of the real part and the antisymmetrical component of the imaginary part of the digital signal and a sum of the antisymmetrical component of the real part and the symmetrical component of the imaginary part of the digital signal;
a correcting unit which corrects a value of the sum of the antisymmetrical component of the real part and the symmetrical component of the imaginary part created in the separating circuit;
a combining circuit which combines the sum of the antisymmetrical component of the real part and the symmetrical component of the imaginary part corrected by the correcting unit and the sum of the symmetrical component of the real part and the antisymmetrical component of the imaginary part;
an inverse Fourier transformer which converts the digital signal obtained as a result of combination in the combining circuit from a frequency domain to a time domain; and
a converting circuit which converts the digital signal having the real part and the imaginary part and converted in the inverse Fourier transformer into an analog signal having an in-phase component and a quadrature component respectively,
the analog signal being transmitted from an antenna and the correcting unit performing a correction according to a deviation of output timing of the quadrature component from the in-phase component occurring at conversion in the converting circuit or a deviation of amplitude and phase between the real part and the imaginary part occurring across the antenna and the converting circuit.

A wireless communication method according to an aspect of the present invention includes converting an analog signal having an in-phase component and a quadrature component and supplied through an antenna into a digital signal having a real part and an imaginary part of complex number respectively in a converting circuit;
converting the real part and the imaginary part of the digital signal obtained by the converting circuit from a time domain to a frequency domain in a discrete Fourier transformer;
separating the digital signal converted to a frequency domain by the discrete Fourier transformer into a sum of a symmetrical component of the real part and an antisymmetrical component of the imaginary part of the digital signal and a sum of the antisymmetrical component of the real part and the symmetrical component of the imaginary part, in a separating circuit; and
correcting the sum of the antisymmetrical component of the real part and the symmetrical component of the imaginary part created by the separating circuit, according to a deviation of the imaginary part from the real part at sampling timing occurring at analog-digital conversion in the converting circuit or a deviation of amplitude and phase between the real part and the imaginary part occurring across the antenna and the converting circuit, in a correcting unit.

BRIEF DESCRIPTION OF THE SEVERAL VIEWS OF THE DRAWING

FIG. 4 is a conceptual view of a subcarrier (carrier wave) in a first communication channel used by the wireless communication system according to the first embodiment of the invention;

FIG. 5 is a block diagram showing an example of a wireless communication device according to the first embodiment of the invention;

FIG. 6 is a block diagram of a receiving unit in the wireless communication device according to the first embodiment of the invention;

FIGS. 8 and 9 are block diagrams of each correcting unit included in the receiving unit in the wireless communication device according to the first embodiment of the invention;

FIG. 10 is a block diagram of a combining circuit included in the receiving unit in the wireless communication device according to the first embodiment of the invention;

FIG. 11 is a block diagram of a transmitting unit in the wireless communication device according to the first embodiment of the invention;

FIG. 12 is a block diagram showing an example of a wireless communication device according to a second embodiment of the invention;

FIG. 15 is a block diagram showing an example of a butterfly/mismatch correction circuit included in the wireless communication device according to the third embodiment of the invention;

FIG. 19 is a block diagram showing an example of the wireless communication device according to the fourth embodiment of the invention.

DETAILED DESCRIPTION OF THE INVENTION

Figure 1:
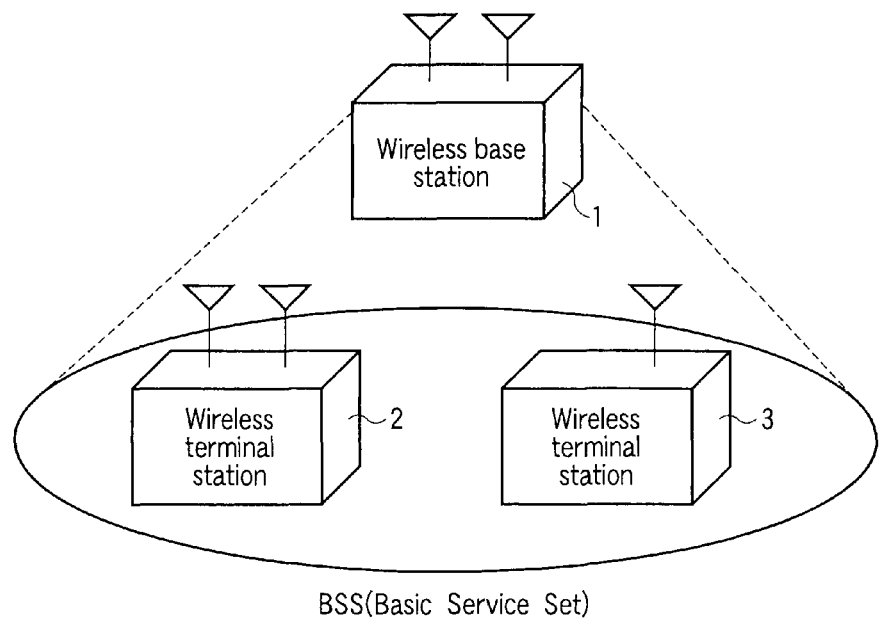
FIG. 1 is a block diagram of a wireless communication system according to a first embodiment of the invention.

Hereinafter, preferred embodiments of the invention will be described with reference to the drawings. In the description, the same reference numerals and marks are attached to the same parts which are common in all the drawings.

First Embodiment

A wireless communication device according to a first embodiment of the invention will be described with reference to FIG. 1. FIG. 1 is a schematic view of the wireless communication system according to the embodiment and shows the wireless communication system which performs OFDM (Orthogonal Frequency Division Multiplexing) modulation according to the IEEE802.11a Standard.

As shown in FIG. 1, the wireless communication system according to the embodiment includes a wireless base station 1 and wireless terminal stations 2 and 3, and wireless communication is performed among them. A unit formed by the wireless base station 1 and at least one wireless terminal station is called BSS (Basic Service Set) in the IEEE 802.11 Standard. Although FIG. 1 shows a case of including two wireless terminal stations in the BSS, the number of the wireless base stations is not particularly limited. Further, the wireless terminal stations 2 and 3 may have a plurality of antennas capable of transmitting and receiving data streams. The wireless base station 1 having a plurality of antennas and the wireless terminal station 3 having a single antenna may be mixed in the BSS. The number of antennas mounted in the wireless base station 1 and the wireless terminal stations 2 and 3 may be one or more according to a communication method in the wireless communication system.

<Communication Channel>

Figure 2:
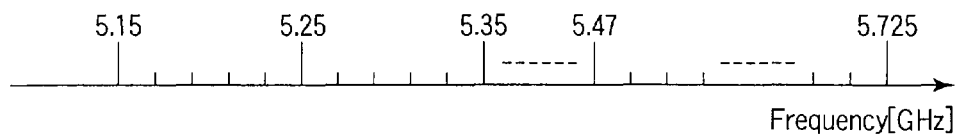
FIG. 2 is a communication channel used by the wireless communication system according to the first embodiment of the invention.

FIG. 2 is a conceptual view showing a frequency band used in the wireless communication system according to the embodiment. The communication method used in the embodiment is the IEEE802.11a Standard. Thus, the frequency band used in the wireless communication system is from 5.15 GHz to 5.25 GHz, from 5.25 GHz to 5.35 GHz, and from 5.47 GHz to 5.725 GHz and in the wireless base station 1, band width of 20 [MHz] is used for wireless communication.

Figure 3:
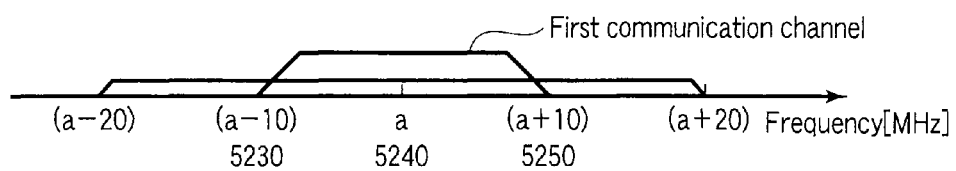
FIG. 3 is a band diagram showing a frequency band used by the wireless communication system according to the first embodiment of the invention.

FIG. 3 is a band diagram showing the frequency band used in the wireless communication system according to the embodiment. As shown in FIG. 3, the wireless communication system uses a first frequency band. The first frequency band has a band width of 20 MHz from (a−10) to (a+10) [MHz] in the above-mentioned usable frequency bands shown in FIG. 2. Hereinafter, the band corresponding to the first frequency band is referred to as a first communication channel. For example, when the value of a is fixed at 5240 [MHz], the value of (a+10) becomes 5250 [MHz] and the value of (a−10) becomes 5230 [MHz], in the frequency band used in the above wireless communication system shown in FIG. 1. In the wireless communication using the OFDM modulation according to the embodiment, a first communication channel from 5230 [MHz] to 5250 [MHz] with 5240 [MHz] as a center frequency, that is, a band width of 20 [MHz] is separated into 64 (hereinafter, referred to as 64 points) and the respectively assigned frequencies are used for communication. In the Fourier transform described later, the Fourier operation is performed on the digital signals for the separated 64 points.

When the first communication channel of the above-mentioned 20 [MHz] band is used, the band of 40 MHz with the respective bands of 10 [MHz] added on the side of low frequency and the side of high frequency in the first communication channel is actually used. As shown in FIG. 3, in the case of using the first communication channel with the center frequency of a [MHz], the frequency band width of 40 [MHz] from (a−20) to (a+20) [MHz] is used actually. The reason why the band of ±10 MHz is additionally used is as follows.

This is for avoiding interference with a wireless communication system conforming to the other IEEE 802.11 Standard different from that of the BSS to which the system belongs and a wireless communication system based on a standard different from the IEEE 802.11 Standard in receiving signals. In transmitting signals, it is intended to avoid unnecessary power radiation to the above-mentioned other wireless communication system based on the same standard and the wireless communication system based on the different standard.

At a receiving time, after a wireless unit described later receives the 40 [MHz] band width, as illustrated, an analog low-pass filter separates unnecessary ±10 [MHz] on both sides. Here, the first communication channel becomes the 20 [MHz] band width. The analog low-pass filter, however, cannot filter the signals in the band from (a−10) to (a+10) [MHz] strictly as shown in the first communication channel. In other words, the signals are supplied to an A/D converter with the frequency lower than (a−10) [MHz] and the frequency higher than (a+10) [MHz] remaining as they are. Therefore, after sampling the band of 40 [MHz] as shown in the A/D converter, unnecessary bands, in other words, the bands from (a−20) [MHz] to (a−10) [MHz] and from (a+10) [MHz] to (a+20) [MHz] are separated by the digital low-pass filter. The bands of ±10 [MHz] on the both sides outside the first communication channel are abandoned.

FIG. 4 shows that the first communication channel is divided into 64 points. In FIG. 4, the frequencies using the band width of 20 [MHz] from (a−10) to (a+10) [MHz] are divided into 64 points with a [MHz] fixed at a center. In addition, in the frequencies actually used in the wireless communication, of the frequencies divided into the 64 points, the frequencies having 26 points respectively in right and left sides with the center frequency a [MHz] fixed at a center, in other words, 52 points are used. These 52 frequencies used in the wireless communication are referred to as subcarriers (carrier waves). The number corresponding to the above-mentioned 52 subcarriers (hereinafter, referred to as subcarrier number) is defined as 'k'. Here, the value of 'k' is one of the numbers '−26' to '26' (except '0') corresponding to the 52 subcarriers. As illustrated, in the first communication channel, the number corresponding to the highest subcarrier is defined as 'k'=26 and the number corresponding to the lowest subcarrier is defined as 'k'=−26. The number corresponding to the second highest subcarrier is defined as 'k'=25 and the number corresponding to the second lowest subcarrier is defined as 'k'=−25. Hereinafter, the numbers corresponding to the respective subcarriers are assigned up to 'k'=−1 and 1 in the same way. When the value of 'k' is '0' in FIG. 4, it shows the DC component.

The a [MHz] that is the center frequency of the first communication channel shown in FIG. 4 is the DC component and corresponds to the subcarrier number ('k'=0). The DC component is not used for wireless communication.

In the wireless communication device using the OFDM modulation, a wireless communication is performed by carrying signals in the 52 subcarriers.

<Structure of Wireless Base Station and Terminal Station>

Next, the structure of the above-mentioned wireless base station 1 and wireless terminals 2 and 3 will be described. The wireless base station 1 and the wireless terminals 2 and 3 have almost the same structure and hereinafter, the case of the wireless base station 1 will be described as an example. FIG. 5 is a block diagram of the wireless base station 1 (hereinafter, referred to as the wireless communication device 1). As illustrated, the wireless communication device 1 roughly includes an antenna 10, a wireless unit 11, a transmitting unit 12, and a receiving unit 13. The wireless unit 11 and the receiving unit 13 include analog or digital low-pass filters (not shown).

The antenna 10 receives wireless signals (RF signals: analog signals) transmitted from the wireless terminals 2 and 3 in the BSS and transmits the wireless signals to the wireless terminals 2 and 3.

At the time of receiving the wireless signals, the wireless unit 11 down-converts the wireless signals of 5 GHz band received through the antenna 10 into baseband signals and then eliminates the unnecessary frequency components through the analog filter in order to make them just the 20 [MHz] band that is the first communication channel. Then, the wireless unit 11 supplies the signals to the receiving unit 13. At the time of transmitting the wireless signals, the wireless unit 11 eliminates the frequency components other than the 20 [MHz] band through the analog filter in order to avoid unnecessary signals from being carried in the frequencies other than the first communication channel of the baseband signals transmitted from the transmitting unit 12. Then, the wireless unit 11 up-converts the signals into the wireless signals of the 5 GHz band and transmits them through the antenna 10.

The transmitting unit 12 receives transmission data as a packet from a data creating unit not illustrated. The transmission data is the data modulated according the IEEE802.11a Standard by the data creating unit. The transmission data is the baseband signals, for example, with the order exchange processing of the digital signals, or interleave performed after the error correction coding. The transmitting unit 12 performs a correction on the received baseband signals in a frequency domain according to a timing mismatch of the quadrature components $q_{ch}$ and in-phase components $i_{ch}$ of the analog signals occurring when converting the following digital signals into the analog signals. Hereinafter, the correction is referred to as a mismatch correction. Then, the transmitting unit 12 converts the digital signals into the analog signals and supplies the analog signals with the quadrature components $q_{ch}$ and the in-phase components $i_{ch}$ having the same output timing to the wireless unit 11.

The receiving unit 13 converts the baseband signals supplied from the wireless unit 11 from the analog signals into the digital signals upon receipt of the wireless signals. Further, the receiving unit 13 performs demodulation processing of the OFDM signals on the baseband signals converted into the digital signals. In the OFDM demodulation processing, the receiving unit 13 performs the correction on the baseband signals received from the wireless unit 11 in the frequency domain according to the timing deviation at the output which occurs when converting the quadrature components $q_{ch}$ and the in-phase components $i_{ch}$ of the analog signals into the digital signals. Hereinafter, the above correction is referred to as a mismatch correction also in the case of reception. Then, the packets are supplied to a demodulation unit performing the data processing not illustrated.

Here, the mismatch will be described. In the wireless communication system according to the embodiment, the wireless communication is performed by using a quadrature modulation and demodulation method. In the quadrature modulation and demodulation method, two signals having a phase difference of 90 degrees are combined as one combined signal and transmitted. One signal of the combined signals is referred to as an I component (in-phase component) and the other of the combined signals is referred to as a Q component (quadrature component).

In the quadrature modulation and demodulation method, the D/A converter, the A/D converter, and a part of the wireless unit are formed by two circuits of the same structure, and one is the circuit for the I components and the other for the Q components. The circuit for the I components and the circuit for the Q components ideally have the same frequency property. Actually, however, the sampling timing deviates from each other in the D/A converters or the A/D converters. Further, the frequency property of the amplitude and the phase is deviated by a property difference in a resistance value and capacity of the elements existing in the analog circuit, or there is a difference in the wiring and there occurs a fixed attenuation in the amplitude and a phase rotation, so that there actually occurs a difference in the frequency property inevitably between the I component circuit and the Q component circuit. Hereinafter, the difference in the frequency property between the I component circuit and the Q component circuit will be referred to as mismatch simply.

<Details of Receiving Unit 13>

Next, the details of the receiving unit 13 will be described with reference to FIG. 6. FIG. 6 is a block diagram of the receiving unit 13. As illustrated, the receiving unit 13 includes A/D converting units (hereinafter, referred to as ADC units) 13a and 13b, an FFT (First Fourier Transform) unit 13c, a separating circuit 13d, a multiplying unit 13e, a correcting unit 13g, and a combining circuit 13f.

<ADC Units 13a and 13b>

The ADC unit 13a converts the in-phase component $i_{ch}$ of the analog signal supplied from the wireless unit 11 into the digital signal that is a real part of a complex number. The ADC unit 13b converts the quadrature component $q_{ch}$ of the analog signal supplied from the wireless unit 11 into the digital signal that is an imaginary part of the complex number.

Here, the sampling frequency of the analog signal is regarded as 40 [MHz]. Specifically, the analog signals sampled every 25 [nsec] are converted into the digital signals. Then, the above-mentioned (a−10) [MHz] on the side of low frequency and the above-mentioned (a+10) [MHz] on the side of high frequency are separated by using the digital filter. By thinning out every other data sampled at 40 [MHz] in time series, it becomes the digital signals sampled at 20 [MHz]. The ADC units 13a and 13b supply the wireless signals converted into the digital signals (hereinafter, it may be referred to as digital signals simply) to the FFT unit 13c. Here, a real part of the complex number in a time domain in each of the converted digital signals is defined as $I_{ch}$ and the imaginary part is defined as $Q_{ch}$.

<FFT Unit 13c>

The FFT unit 13c converts the real parts $I_{ch}$ and the imaginary parts $Q_{ch}$ of the digital signals obtained in the ADC units 13a and 13b from the time domain to the frequency domain. After the conversion, the FFT unit 13c supplies the digital signals converted into the frequency domain to the separating circuit 13d.

The FFT unit 13c performs the 64-point Fourier transform. As mentioned above, the ADC units 13a and 13b transmit the digital signals sampled at 20 [MHz]. Therefore, the FFT unit 13c takes 3.2 [μsec] to receive the digital signals, the real parts $I_{ch}$ and the imaginary parts $Q_{ch}$, supplied from the ADC units 13a and 13b, for 64 points. The FFT unit 13c maps the digital signals for the 64 points which are accumulated every 3.2 [μsec] to 52 subcarriers shown in FIG. 4 and converts the signals into the frequency domain. For example, as shown in FIG. 4, the signals including 64 real parts $I_{ch}$ and 64 imaginary parts $Q_{ch}$ are assigned to the 52 subcarriers by using the 20 [MHz] band that is the first communication channel from 5230 [MHz] to 5250 [MHz].

The digital signals for the 64 points carried in the 52 subcarriers are referred to as 1 OFDM symbol.

The interval from the first 1 OFDM symbol to the next 1 OFDM symbol received by the FFT unit 13c is for 16 points, in other words, 0.8 [μsec] and this is referred to as a guard interval.

<Separating Circuit 13d>

Next, the separating circuit 13d will be described. The separating circuit 13d separates the digital signals decomposed in the frequency domain and supplied from the FFT unit 13c into the components corresponding to the real parts $I_{ch}$ that have been the in-phase components $i_{ch}$ in the time domain and the components corresponding to the imaginary parts $Q_{ch}$ that have been the quadrature components $q_{ch}$. Here, the details of the separating circuit 13d will be described with reference to FIG. 7.

<Details of Separating Circuit 13d>

Figure 7:
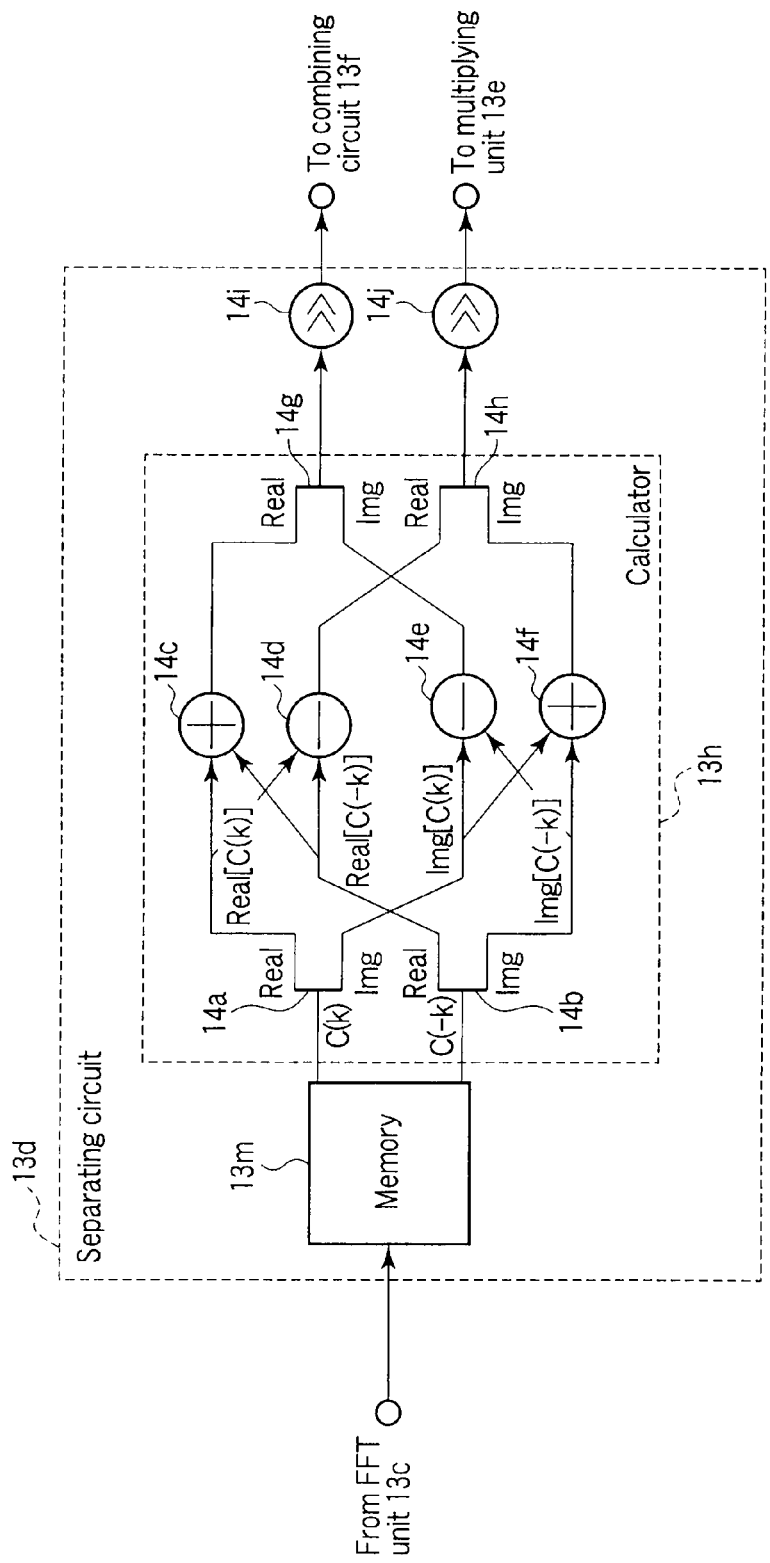
FIG. 7 is a block diagram of a separating circuit included in the receiving unit in the wireless communication device according to the first embodiment of the invention.

FIG. 7 is a block diagram showing the details of the separating circuit 13d. The separating circuit 13d includes a memory 13m, a calculator 13h, and scalers 14i and 14j. As illustrated, the separating circuit 13d stores the digital signals of the complex numbers supplied from the FFT unit 13c into the memory 13m temporarily. When the digital signals for 1 OFDM symbol are accumulated, the memory 13m outputs each pair of positive and negative frequency components having the same absolute value. In other words, the positive and negative components are supplied to each of the 52 subcarriers. The real part $I_{ch}$ and the imaginary part $Q_{ch}$ of the digital signal corresponding to the subcarrier number 'k'=±j ($1 \leq j \leq 26$, j is a natural number) are supplied in the frequency domain.

Then, the frequency components (digital signals) supplied from the memory 13m are supplied to the calculator 13h. The supplied digital signals are separated into the components corresponding to the real parts $I_{ch}$ and the components corresponding to the imaginary parts $Q_{ch}$ in the time domain by the calculator 13h and then, the size of the digital signals is divided into half by the scalers 14i and 14j.

Hereinafter, the structure of the calculator 13h will be described and after that, the flow of the digital signals which enter the calculator 13h will be described.

At first, the calculator 13h includes separating units 14a and 14b, combining units 14g and 14h, adders 14c and 14f, and subtracters 14d and 14e.

The digital signals of the positive and negative complex numbers obtained from the memory 13m are supplied to the separating units 14a and 14b. The separating unit 14a separates the digital signals having the positive frequency components supplied from the memory 13m into the real part components (described as Real in FIG. 7) and the imaginary part components (described as Img in FIG. 7) and outputs them respectively. The real part components are supplied to the adder 14c and the attenuator 14d and the imaginary part components are supplied to the subtracter 14e and the adder 14f. The separating unit 14b separates the digital signals having the negative frequency components supplied from the memory 13m into the real part components (described as Real in FIG. 7) and the imaginary part components (described as Img in FIG. 7) to output them respectively. The real part components are supplied to the adder 14c and the subtracter 14d and the imaginary part components are supplied to the subtracter 14e and the adder 14f.

In the adder 14c, the real part components of the complex numbers supplied from the separating unit 14a and the real part components of the complex numbers supplied from the separating unit 14b are combined. In the subtracter 14d, the real part components of the complex numbers supplied from the separating unit 14b are subtracted from the real part components of the complex numbers supplied from the separating unit 14a. In the subtracter 14e, the real part components of the complex numbers supplied from the separating unit 14b are subtracted from the imaginary part components (described as Img in FIG. 7) of the complex numbers supplied from the separating unit 14a. In the adder 14f, the imaginary part components of the complex numbers supplied from the separating unit 14a and the imaginary part components of the complex numbers supplied from the separating unit 14b are combined.

In the combining unit 14g after the calculator 13h, the output of the adder 14c and the output of the subtracter 14e are combined. Similarly, in the combining unit 14h after the calculator 13h, the output of the subtracter 14d and the output of the adder 14f are combined.

Further, the size of the components supplied from the combining unit 14g is divided into half by the scaler 14i and the size of the components supplied from the combining unit 14h is also divided into half by the scaler 14j.

<Flow of Digital Signal in FFT Unit 13c and Separating Circuit 13d>

The flow of the digital signals in the above-mentioned FFT unit 13c and separating circuit 13d will be described for easy understanding of it by using the following expressions.

At first, the in-phase component $i_{ch}$ is defined as f(t) and the quadrature component $q_{ch}$ is defined as g(t) in the time domain of an analog signal. The embodiment uses the fact that an image component of complex conjugate is created when f(t) and g(t) are calculated by the FFT unit 13c. The above-mentioned f(t) and g(t) are Fourier-transformed in the FFT unit 13c. The results are defined as F(k) and G(k). Here, $$\text{Real}[F(k)] = \text{Real}[F(-k)] \quad (1)$$

$$\text{Img}[F(k)] = -\text{Img}[F(-k)] \quad (2)$$

$$\text{Real}[iG(k)] = -\text{Real}[iG(-k)] \quad (3)$$

$$\text{Img}[G(k)] = -\text{Img}[G(-k)] \quad (4)$$

are satisfied. Not only in the above expressions, but also in the following expressions, i is an imaginary unit. When f(t)+ig(t) is Fourier-transformed, it becomes F(k)+iG(k).

Further, the following expressions are satisfied as for F(k)+iG(k).

$$\text{Real}[F(k)+iG(k)] = \text{Real}[F(k)] + \text{Real}[iG(k)] \quad (5)$$

$$\text{Real}[F(-k)+iG(-k)] = \text{Real}[F(k)] - \text{Real}[iG(k)] \quad (6)$$

$$\text{Img}[F(k)+iG(k)] = \text{Img}[F(k)] + \text{Img}[iG(k)] \quad (7)$$

$$\text{Img}[F(-k)+iG(-k)] = -\text{Img}[F(k)] + \text{Img}[iG(k)] \quad (8)$$

From the above expressions, $$2 \times \text{Real}[F(k)] = \text{Real}[F(k)+iG(k)] + \text{Real}[F(-k)+iG(-k)] \quad (9)$$

$$2 \times \text{Real}[iG(k)] = \text{Real}[F(k)+iG(k)] - \text{Real}[F(-k)+iG(-k)] \quad (10)$$

$$2 \times \text{Img}[F(k)] = \text{Img}[F(k)+iG(k)] - \text{Img}[F(-k)+iG(-k)] \quad (11)$$

$$2 \times \text{Img}[iG(k)] = \text{Img}[F(k)+iG(k)] + \text{Img}[F(-k)+iG(-k)] \quad (12)$$

can be obtained. Here, when the result supplied from the FFT unit 13c is defined as C(k), since the FFT 13c outputs each pair of the positive and negative frequency components, $$C(k) = F(k)+iG(k) \ (k=-26 \text{ to } 26, k \neq 0) \quad (13)$$

$$C(-k) = F(-k)+iG(-k) \ (k=-26 \text{ to } 26, k \neq 0) \quad (14)$$

are satisfied. When the above expressions (13) and (14) are substituted for (9) to (12), the following relational expressions are obtained:

$$2 \times F(k) = (\text{Real}[C(k)+C(-k)] + i\text{Img}[C(k)-C(-k)]) \quad (15)$$

$$2 \times G(k) = (\text{Real}[C(k)-C(-k)] + i\text{Img}[C(k)+C(-k)]) \quad (16)$$

In the right side of the expression (15), Real[C(k)+C(−k)] shows the symmetrical component of the real part and Img[C(k)−C(−k)] shows the antisymmetrical component of the imaginary part. In other words, according to the expression (15), the sum of the symmetrical component of the real part and the antisymmetrical component of the imaginary part becomes the real part $I_{ch}$ in the time domain.

In the right side of the expression (16), Real [C(k)−C(−k)] shows the antisymmetrical component of the real part and Img [C(k)+C(−k)] shows the symmetrical component of the imaginary part. According to the expression (16), the sum of the antisymmetrical component of the real part and the symmetrical component of the imaginary part becomes the imaginary part $Q_{ch}$ in the time domain. The memory 13m outputs the above expressions (13) and (14). Upon receipt of them, the separating unit 14a outputs the expressions (5) and (7) based on the expression (13). The separating unit 14b outputs the expressions (6) and (8) based on the expression (14). The combining unit 14g outputs the expression (15) based on the operation result of the adder 14c and the subtracter 14e. The combining unit 14h outputs the expression (16). Since the expressions (15) and (16) obtain double the value of F(k) and G(k), the scalers 14i and 14j halve the expressions (15) and (16). As a result, the scalers 14i and 14j output F(k) and G(k), respectively. In other words, the circuit structure satisfying the above expressions (15) and (16) is the calculator 13h shown in FIG. 7.

<Correcting Unit 13g>

Next, the correcting unit 13g shown in FIG. 6 will be described with reference to FIG. 8. FIG. 8 shows a block diagram of the correcting unit 13g. As shown in the diagram, the correcting unit 13g includes terminals 15a and 15e, memories 15b and 15d, and a multiplying unit 15c.

The terminal 15a recognizes the 52 subcarrier numbers 'k' from the input digital signals separated in the separating circuit 13d and supplies the above to the multiplying unit 15c.

The memory 15b stores the value T of a timing deviation at sampling. The value T supplied from the memory 15b is supplied to the multiplying unit 15c.

The multiplying unit 15c multiplies the supplied subcarrier number 'k' and the value 'T'. After that, it supplies the multiplied value 'kT' to the memory 15d.

After creating a complex cosine function exp(iφ) with a parameter of the angle φ in proportion to 'kT' supplied from the multiplying unit 15c, the memory 15d supplies the function to the multiplying unit 13e through the terminal 15e. The memories 15b and 15d are nonvolatile memories. Hereinafter, the angle φ created based on 'kT' will be described. The value of the subcarrier number 'k' is defined as '1' or '2' by way of example and the value of 'T' is defined as 10 [nsec]. It means that the sampling deviation is 10 [nsec]. Further, when the subcarrier interval defined by the OFDM wireless standard is defined as 'Δf'=312.5 [KHz], the frequency in the baseband of 'k'=1 is 312.5 [kHz] and the frequency in the baseband of 'k'=2 is 625 [kHz]. The wave of 312.5 [kHz] is 10 [nsec] and the phase shifts by '2π×312.5 [kHz]×10 [nsec]'='6.25×10^(−3)×π'. Similarly, the wave of 624 [kHz] is 10 [nsec] and the phase shifts by '12.5×10^(−3)×π'. Therefore, correction is needed on the imaginary part $Q_{ch}$ of the complex number for the shift amount. The correction amount 'φ' of the phase is shown by '2π×Δf×k×T', in proportion to 'kT'. The memory 15d multiplies the supplied value 'kT' by the value of '2π×Δf' to get a phase correction amount and supplies the value of the complex cosine function exp(iφ) with the phase correction amount as a parameter from the correcting unit 13g.

<Multiplying Unit 13e>

The multiplying unit 13e multiplies the value corresponding to a mismatch of the sampling timing occurring between the ADC units 13a and 13b by the imaginary part $Q_{ch}$ component in the time domain, in other words, the sum of the antisymmetrical component of the real part and the symmetrical component of the imaginary part with the expression (14) halved by the scaler 14j according to the correction parameter created in the correcting unit 13g. Thus, the mismatch of the sampling timing occurring between the ADC units 13a and 13b is corrected.

Hereinafter, the flow of multiplying G(k) by the "correction parameter (angle φ)" created in the correcting unit 13g, in the digital signals separated from the separating circuit 13d through the above scaler 14j will be described for easy understanding by using the following expressions.

Here, a mismatch of the sampling timing between the ADC units 13a and 13b occurs and for example, 13b performs the sampling behind 13a by the time T. In this case, the multiplying unit 13e multiplies the 52 subcarriers created by the correcting unit 13e by the rotational factor exp (−2πiΔfkT), (−26≦k≦26, k≠0) created by the correction parameter.

When the amplitude in the subcarrier number 'k' is defined as A(k), it becomes the following waves in the time domain:

$$\sum_k A(k)\exp(2\pi i \Delta fkT) \quad (17)$$

Here, the subcarrier number 'k' is one of the subcarriers in the first communication channel. When the waves shown by the expression (17) are sampled at a point behind the sampling timing $T_0$ of the ADC unit 13a by the time T1, it becomes as follows:

$$\sum_k A(k)\exp(2\pi i \Delta fk(T_0 + T_1)) \quad (18)$$

When the expression (18) is Fourier-transformed, it should be the frequency component A(k) normally, but because of a delay in the sampling timing, it becomes as follows:

$$A(k)\exp(2\pi i \Delta fkT_1) \quad (19)$$

After generating a complex number of the rotational factor $\exp(-2\pi i \Delta fkT_1)$ on the expression (19) in the correcting unit 13g, it is multiplied according to the expression (19) in the multiplying unit 13e. Therefore, the sampling timing deviation occurring between the ADC units 13a and 13b is corrected in the frequency domain. As a result, the timing deviation shown in the expression (19) is corrected.

The value of the deviation of the sampling timing may use the deviation previously measured as for the subcarrier number 'k' used in the ADC units 13a and 13b. Alternatively, every time the amplitude deviation and the phase deviation as for the subcarrier number 'k' may be measured in the ADC units 13a and 13b, and the result may be supplied to the memory 15b.

Other than the timing deviation at sampling in the ADC units 13a and 13b, there may be increase or decrease in the amplitude of the digital signal depending on the frequency 'fk'='Δfk' and a phase shift in the ADC units 13a and 13b. This is caused by the parasitic capacity of the circuit from the wireless unit 11 to the input terminals of the ADC units 13a and 13b as shown in FIG. 5. Hereinafter, correction of the deviation in the amplitude and the phase in the ADC units 13a and 13b will be described. The correction of the deviation in the amplitude and the phase is also referred to as mismatch correction.

In the wireless communication device 1 according to the embodiment, the deviation of the analog signal supplied to the ADC unit 13b from the analog signal supplied to the ADC unit 13a is defined as X(k) (for example, X(k)=|X(k)|exp(iφ), where |X(k)|: amplitude, φ: phase, i: imaginary unit). The correcting unit 13g' creates a correction parameter on the deviation of the amplitude and phase. The case of replacing the correcting unit 13g in FIG. 6 with the correcting unit 13g' will be described. The deviation of the amplitude means increase or decrease in the amplitude of the imaginary part $Q_{ch}$ from the real part $I_{ch}$ in the time domain. Similarly, the deviation of the phase means the phase difference (advance or delay) between the imaginary part $Q_{ch}$ and the real part $I_{ch}$ in the time domain.

<Correcting Unit 13g'>

The correcting unit 13g' will be described with reference to FIG. 9. FIG. 9 is a block diagram of the correcting unit 13g'. The correcting unit 13g' includes terminals 16a and 16c and a memory 15b. The block diagram shows the structure in the case where there is the above-described deviation of the amplitude and the phase assuming that there is no timing deviation at sampling.

Similarly to the terminal 15a, the subcarrier number 'k' enters the terminal 16a.

The memory 16b stores the inverse number of the amplitude and the inverse number of the deviation in the phase 1/X(k), for example, {1/|X(k)|}exp(−iφ). The inverse number 1/X(k) supplied from the memory 16b is supplied to the multiplying unit 13e through the terminal 16c. Hereinafter, the inverse number 1/X(k) created based on 'k' will be described. The deviation from the frequency 'fk' used in the ADC units 13a and 13b may be measured in advance with respect to the value of the inverse number 1/X(k). The deviation of the amplitude and the phase from the frequency 'fk' may be measured every time in the ADC units 13a and 13b and the results may be supplied to the memory 16b.

When the analog signal supplied to the ADC 12a is as follows:

$$\mathrm{Real}\left\{\sum_k A(k)\exp(2\pi i \Delta fkt)\right\} \quad (20)$$

and the analog signal supplied to the ADC 12b is as follows:

$$\mathrm{Img}\left\{\sum_k A(k)\exp(2\pi i \Delta fkt)\right\}, \quad (21)$$

the analog signals shown in these expression (20) and (21) which are supplied from the ADC units 13a and 13b become as the following expressions (20') and (21') due to the mismatch of parasitic capacity. Where, X(k) is the amplitude of the component corresponding to the imaginary part $Q_{ch}$ in the subcarrier number 'k'.

$$\mathrm{Real}\left\{\sum_k A(k)\exp(2\pi i \Delta fkt)\right\} \quad (20')$$

$$\mathrm{Img}\left\{\sum_k X(k)A(k)\exp(2\pi i \Delta fkt)\right\} \quad (21')$$

The expressions (20') and (21') are supplied as the digital signals. Further, the expressions (20') and (21') are Fourier-transformed in the FFT unit 13c, and then separated in the separating circuit 13d. Next, the digital signal corresponding to the real part $I_{ch}$ in the time domain is A(k) and the digital signal corresponding to the imaginary part $Q_{ch}$ is X(k) A(k).

The deviation of the amplitude and the phase occurs in the digital signal corresponding to the imaginary part $Q_{ch}$ by $X(k)$. The inverse number $1/X(k)$ created by the correcting unit 13g' is multiplied by $X(k) A(k)$ in the multiplying unit 13e, and the digital signal corresponding to the imaginary part $Q_{ch}$ in the time domain becomes $A(k)$.

By providing the correcting unit 13g' shown in FIG. 9, even when there occurs the deviation of the amplitude and the phase depending on the frequencies 'fk' of the in-phase components $i_{ch}$ and the quadrature components $q_{ch}$ of the analog signals supplied to the ADC units 13a and 13b, it can be corrected in the frequency domain.

The correcting unit 13g which corrects the timing deviation at sampling between the ADC units 13a and 13b and the correcting unit 13g' which corrects the deviation of the amplitude and the phase caused by the parasitic capacity between the ADC units 13a and 13b from the antenna 10 have been described respectively. The correcting unit 13g' may be provided with a function of correcting the timing deviation at sampling, in other words, a function of the correcting unit 13g.

<Combining Circuit 13f>

Next, the combining circuit 13f will be described with reference to FIG. 10. FIG. 10 shows a block diagram of the combining circuit 13f. The combining circuit 13f includes terminals 17a, 17b, and 17d, and an adder 17c. In the combining circuit 13f, the components that have been the real parts $I_{ch}$ and the components that have been the imaginary parts $Q_{ch}$ in the time domain supplied from the terminals 17a and 17b are added together in the adder 17c, hence to return to the original frequency components. Then, they are supplied from the terminal 17d to a data processing unit not illustrated. As a specific method, the adder 17c performs only the complex addition. Namely, the combining circuit 13f adds the value of half of the expression (13) to the corrected value of the half of the expression (14).

<Details of Transmitting Unit 12>

Next, the details of the transmitting unit 12 in FIG. 5 will be described with reference to FIG. 11. FIG. 11 is a block diagram of the transmitting unit 12.

Since the transmitting unit 12 has the same structure as the receiving unit 13 except the D/A converters (hereinafter, referred to as the DAC units) 12a and 12b and the IFFT unit 12c, a description thereof will be simply made as follows. From the side of the data creating unit not illustrated, a separating circuit 12f, a multiplying unit 12e, a correcting unit 12g, a combining circuit 12d, an inverse Fourier transformer 12c, and DAC units 12a and 12b are connected in this order.

The IFFT unit 12c converts the digital signals from the frequency domain to the time domain by using the inverse Fourier transform.

The DAC units 12a and 12b convert the digital signals into the analog signals. At this time, the real parts $I_{ch}$ and the imaginary parts $Q_{ch}$ in the time domain of the digital signals become the in-phase components $i_{ch}$ and the quadrature components $q_{ch}$ in the analog signals respectively.

The structure of the correcting unit 12g is the same as the correcting unit 13g. A parameter created by the correcting unit 12g, however, becomes the value corresponding to a mismatch of the output timing of the analog signals which occurs between the DAC units 12a and 12b, differently from the correcting unit 13g. For example, at first, assume that the real parts $I_{ch}$ are defined as Real $\{A(k)\}$ and the imaginary parts $Q_{ch}$ are defined as Img $\{A(k)\}$ in the time domain. Assume that the output timing of the analog signals from the DAC unit 12b delays by the time $T_1$ compared with the DAC unit 12a. When the analog signals are supplied from the DAC unit 12a at the time $T_0$, the value supplied from the unit 12a at the time $T_0$ is defined as $$\mathrm{Real}\left\{\sum_k A(k)\exp(2\pi i\Delta fkT_0)\right\} \quad (22)$$

According to the above-mentioned condition, the timing supplied from the DAC unit 12b delays by the time $T_1$ compared with the $T_0$ supplied from the DAC unit 12a. The signals supplied from the unit 12a at the time $T_0$ change to the value of the following expression according to the progress of the phase of the wave component at the time $T_0+T_1$ that is the timing when the unit 12b outputs.

$$\mathrm{Real}\left\{\sum_k A(k)\exp(2\pi i\Delta fk(T_0+T_1))\right\} \quad (23)$$

On the other hand, when there is no correction, the DAC unit 12b which supplies the imaginary parts $Q_{ch}$ supplies the following value at the time $T_0+T_1$.

$$Img\left\{\sum_k A(k)\exp(2\pi i\Delta fkT_0)\right\} \quad (24)$$

In this state, since the phases of the signals respectively supplied from the DAC units 12a and 12b at the time $T_0+T_1$ are different, there can be no normal communication. The correcting unit 12g multiplies the rotational factor $\exp(2\pi i\Delta\text{-}fkT_1)$ by the components $A(k)$ that are previously supposed to be the imaginary parts $Q_{ch}$ in the frequency domain in the multiplying unit 12e to the signal component supplied from the unit 12b in advance. Therefore, since the value supplied from the DAC unit 12b at the time $T_0+T_1$ is defined as $$Img\left\{\sum_k A(k)\exp(2\pi i\Delta fk(T_0+T_1))\right\}, \quad (25)$$

it is treated as the signal with the uniform phases $I_{ch}$ and $Q_{ch}$ in the wireless unit 11 posterior to the DAC units 12a and 12b. Other than the above-mentioned mismatch of the timing of supplying the analog signals from the DAC units 12a and 12b, the delay in the analog unit such as the wireless unit 11 and the antenna 10 can be also corrected.

The flow of the digital signals in the transmitting unit 12 is as follows. The digital signals in the frequency domain constellation-supplied are supplied to the separating circuit 12f and separated into the real parts $I_{ch}$ and the imaginary parts $Q_{ch}$ in the time domain. Namely, they are separated as shown in the expressions (15) and (16) which have been described in the separating circuit included in the receiving unit 13.

The correcting unit 12g creates a correction parameter on the frequency components separated in the components corresponding to the imaginary parts $Q_{ch}$ in the time domain. Here, the correction parameter created by the correcting unit 12g is a parameter depending on the timing deviation at sampling which occurs between the DAC units 12a and 12b. The created correction parameter is multiplied in the multiplying unit 12e.

Further, the combining circuit 12d adds the components which are the real numbers $I_{ch}$ and the imaginary numbers $Q_{ch}$ in the time domain, hence to restore them to the original frequency components. The combined digital signals in the frequency domain are supplied to the IFFT unit 12c. In the IFFT unit 12c, the supplied digital signals in the frequency domain are converted into the time domain. Then, the digital signals are converted into the analog signals in the DAC units 12a and 12b and the analog signals are transmitted through the wireless unit 11 from the antenna 10 to the wireless terminals 2 and 3.

<Effect>

As mentioned above, the wireless communication device 1 according to the embodiment can obtain the following effects (1) and (2).

(1) The circuit size and the electric power consumption may be reduced.

The conventional wireless communication device uses a method for correcting a deviation in the timing, amplitude, and phase by using a digital filter. In the conventional wireless communication device, however, there is such a problem that the circuit size and the electric power consumption become large because the above-mentioned correction requires the same number of the multiplying units as the number of taps and the output of the value every time at sampling.

In the case of the wireless communication device 1 according to the embodiment, it is not necessary to use the digital filter, unlike the conventional wireless communication device 1. The Fourier transformer, the separating circuit, and the correcting unit for correcting the above deviation in the frequency domain are adopted in the wireless communication device 1 according to the embodiment. Therefore, in the frequency domain, it is enough to multiply the correction by the imaginary part $Q_{ch}$ component in the time domain. In the wireless communication device adopting the digital filter, the multiplying units for the number necessary for the tap operation are formed, while in the embodiment, only one multiplying unit is enough. The circuit size and the electric power consumption can be reduced in the embodiment.

(2) The number of operation times and the electric power consumption may be reduced.

As one reason why the above-mentioned effect (1) is obtained, there is the fact that the wireless communication device 1 according to the embodiment can reduce the operation amount for correcting the above-mentioned deviation.

The correction for the timing deviation at sampling in the conventional wireless communication device is performed in the time domain by the digital filter. At this time, since the digital filter needs the same number of the multiplying units as the number of taps, it is clear that the amount of operation increases necessarily.

In the embodiment, the wireless communication based on the IEEE802.11a Standard which adopts the OFDM modulation is performed. Here, the receiving time of the analog signal in the wireless communication adopting the OFDM modulation will be described.

In the wireless communication adopting the OFDM modulation, a certain desired communication channel is received separately from a communication channel adjacent to the above-mentioned desired one. Specifically, it is necessary to eliminate the signal components at the both sides of the ±10 [MHz] bands of the first communication channel in the wireless communication device according to the embodiment. As mentioned above, in the analog signals supplied to the ADC units 13a and 13b, there remain a frequency lower than the (a−10) [MHz] band and a frequency higher than the (a+10) [MHz] band. Therefore, the sampling is performed on the 40 [MHz] band 160 times including the guard interval per 1 OFDM symbol by the ADC units 13a and 13b. The signal processing for eliminating the signal components of the adjacent communication channel includes two kinds of methods: a method of using the digital filter and a method of increasing the number of points of the Fourier transform, conventionally performed in 64 points, to 128 points. There are a total of four methods: these two methods of eliminating the adjacent channel signals and two kinds of methods of correcting a sampling timing mismatch according to the conventional way and according to the embodiment. Though the method of eliminating the adjacent channel components is not directly related to the effect of the embodiment, the operation method and the operation amount of the signal processing are different, so a comparison is made among these four kinds of the signal processing. The alphabets (a) and (b) show the conventional example and the alphabets (c) and (d) show the embodiment.

(a) A method of performing the 64-points Fourier operation after the correction of a mismatch at the sampling timing and the elimination of the signal components of the adjacent channels are performed by the digital filter.

At first, the digital filter performs the operation for eliminating the signal components of the adjacent channel on the real parts $I_{ch}$. The number of taps of the digital filter is about 11 taps. Since this is performed for the number of input points of the Fourier transformer, the number of times of the actual multiplication becomes 64×11=704 times. The signal component elimination of the adjacent channel as well as the sampling timing mismatch correction are performed on the imaginary parts $Q_{ch}$. When performing the mismatch correction of the sampling timing, the digital filter needs much more taps. When the number of taps is defined as 21, the number of times of the actual multiplication becomes 64×21=1344. The 64-points Fourier operation is formed 192 times of Radix-2 butterfly calculation. Assuming that the complex multiplication is performed once per one Radix-2 butterfly calculation, since one complex multiplication includes four times of the actual multiplication, it corresponds to 768 times of the actual multiplication. Therefore, in this method, the actual multiplication must be performed 2816 times, the total sum of 704, 1344, and 768.

(b) A method of performing the signal component elimination of the adjacent channel through the 128-points Fourier operation after the mismatch correction of the sampling timing is performed by the digital filter.

At first, the sampling timing mismatch correction is calculated on the imaginary part $Q_{ch}$ according to the digital filter. When the number of taps is defined as 21, the number of the output points is 128 points and the actual multiplication is performed 128×21=2688 times. The 128-points Fourier operation is formed by 448 times of the Radix-2 butterfly calculation. It can be estimated as 1792 times of the actual multiplication in the same way as in the case of (a). Therefore, in the method, the actual multiplication has to be performed 4480 times, the total sum of 2688 and 1792. This is larger operation amount than that of (a).

The calculation amount in the embodiment will be described in comparison with the conventional example shown in the above-mentioned (a) and (b).

(c) A method of eliminating the signal components of an adjacent channel through a digital filter, then performing the 64-points Fourier transform, and performing a mismatch correction of the sampling timing in the frequency axis.

At first, the adjacent channel components are eliminated by using the digital filter on the real parts $I_{ch}$ and the imaginary parts $Q_{ch}$. It is performed by the digital filter having 11 taps and the number of output points is 64. Since the actual multiplication of 64×11=704 times is necessary for the real part $I_{ch}$ and the imaginary part $Q_{ch}$ respectively, the actual multiplication of 1408 times must be performed in total. The 64-points Fourier operation estimates the actual operation of 768 times as estimated in (a). The sampling timing mismatch correction in the frequency axis is performed on the 52 subcarriers after the 64-points Fourier operation. Since one complex multiplication is required for one subcarrier, it becomes the actual multiplication of 52×4=208 times. Therefore, in this method, operation will be completed through the actual multiplication of 2384 times, the total sum of 704, 768, and 208.

In comparison between (a) and (c), the operation amount in the wireless communication device 1 according to the embodiment is the smallest. In the embodiment where the adjacent channel components are separated through the 128-points Fourier operation, the operation amount can be further reduced.

(d) A method of performing the sampling timing mismatch correction operation in the frequency axis after eliminating the adjacent channel components through the 128 points Fourier operation.

In this method, at first, the 128-points Fourier operation is performed. It corresponds to the actual multiplication of 1792 times as estimated in (b). Further, the sampling timing mismatch correction operation is performed on the 52 subcarriers in the frequency axis. As estimated in (c), it corresponds to the actual multiplication of 208 times. In this method, the actual multiplication of 2000 times, the total sum of 1792 and 208 is performed to complete the operation. The operation times are the least of (a), (b), and (c).

Though the operation method and the operation amount are changed according to the method of eliminating the adjacent channel components, it is clear that the embodiment is more advantageous than the conventional example from the viewpoint of the operation times.

Further, the calculation of the parameter in the correcting unit 13g and the correcting unit 13g' is easier than that of the digital filter used in the above-mentioned (a) and (b). When using the digital filter, the operation of the Sinc function or the FFT calculation is necessary for calculating the tap coefficient that becomes the created correction parameter. The wireless communication device 1 according to the embodiment can easily and speedily calculate the correction parameter according to the mismatch parameter stored in the converters 12a and 12b. For example, an estimating circuit which estimates the timing deviation between the converters 12a and 12b at sampling is mounted on the same circuit shown in FIGS. 6 and 11. Based on the estimation result of mismatch received from the estimating circuit, the correcting unit 13g can calculate the correction parameter easily.

Second Embodiment

Next, a wireless communication device according to the second embodiment of the invention will be described. The embodiment relates to the timing correction at sampling in the ADC unit in the MIMO (Multiple Input Multiple Output) communication which performs the OFDM modulation. The MIMO communication performs transmission and reception at the same time by using a plurality of antennas. Therefore, the number of the receiving units and the transmitting units depends on the number of antennas. In the embodiment, one set of the antenna, the transmitting unit, and the receiving unit is provided in addition to the wireless communication unit 1 according to the above first embodiment. FIG. 12 is a block diagram of the wireless communication device 1 according to the embodiment.

As illustrated, the wireless communication device 1 according to the embodiment further includes an antenna 20, a second wireless unit 21, a second transmitting unit 22, and a second receiving unit 23 in addition to the structure of FIG. 5 described in the first embodiment. Since the first wireless unit 11, the first transmitting unit 12, and the first receiving unit 13 have the same structure as the wireless unit 11, the transmitting unit 12, and the receiving unit 13 of the receiving unit 13 in FIG. 5, description thereof is omitted. Since the other structure is the same as that of the first embodiment, the description is omitted.

Hereinafter, the antenna 20, the second wireless unit 21, and the second receiving unit 23 will be described.

The antenna 20 in the MIMO communication shown in FIG. 12 receives different data in the same communication channel as the antenna 10. The antenna 20 receives the wireless signals (RF signals: analog signals) transmitted from the wireless terminals 2 and 3 in the BSS shown in FIG. 1 and transmits them to the wireless terminals 2 and 3.

At the time of receiving the wireless signals, after down-converting the wireless signals of 5 GHz band received through the antenna 20 into the baseband signals, the second wireless unit 21 eliminates unnecessary frequency components through the analog filter to make the signals only the 20 [MHz] band that is the first communication channel shown in FIG. 4. Then, the signals are supplied to the second receiving unit 23. At the time of transmitting the wireless signals, in order to avoid the signals unnecessary for the frequencies other than the first communication channel from being carried in the baseband signals given from the second transmitting unit 22, the frequency components other than the 20 [MHz] band are eliminated through the analog filter. Then, the signals are up-converted into the wireless signals of the 5 GHz band and transmitted from the antenna 10.

Figure 13:
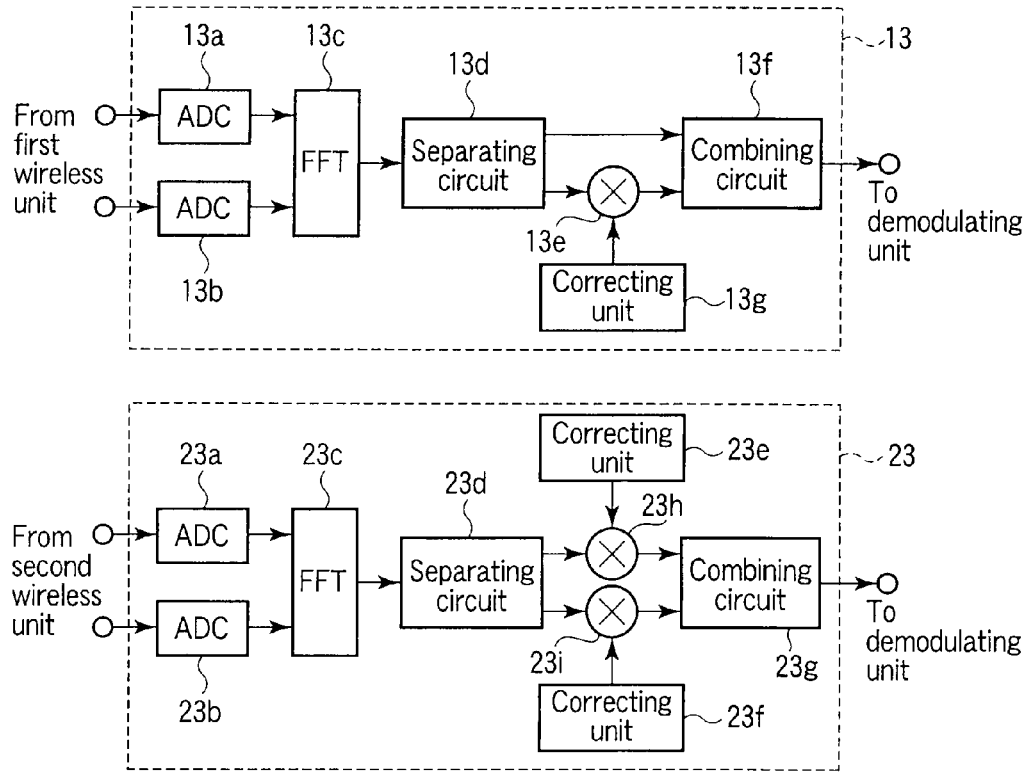
FIG. 13 is a block diagram of a receiving unit in the wireless communication device according to the second embodiment of the invention.

FIG. 13 is a block diagram of the first receiving unit 13 and the second receiving unit 23. Since the receiving unit 13 is the same as that of the first embodiment, the description is omitted. The second receiving unit 23 includes ADC units 23a and 23b, an FFT unit 23c, a separating circuit 23d, multiplying units 23h and 23i, correcting units 23e and 23f, and a combining circuit 23g. Since the ADC units 23a and 23b, the FFT unit 23c, the separating circuit 23d, and the combining circuit 23g are the same as the ADC units 13a and 13b, the FFT unit 13c, the separating circuit 13d, and the combining circuit 13f in the receiving unit 13 respectively, description thereof is omitted and the correcting units 23e and 23f and the multiplying units 23h and 23i will be described hereinafter.

<Correcting Units 23e and 23f>

The correcting unit 23e creates a correction parameter according to a timing deviation of the ADC unit 23a from the ADC unit 13a that is a reference. The correcting unit 23f creates a correction parameter according to a timing deviation of the ADC unit 23b from the ADC unit 13a that is a reference.

Even when the respective timings at sampling between the ADC units 13a and 13b, between the ADC units 13a and 23a, and between the ADC units 13a and 23b are different, the correction can be realized in the above-mentioned method.

Since the method of creating the correction parameter in the correcting units 23e and 23f is the same as the above-mentioned first embodiment, the description thereof is omitted here.

<Multiplying Units 23h and 23i>

The multiplying units 23h and 23i multiply the respective correction parameters created in the correcting units 23e and 23f by the real part $I_{ch}$ and the imaginary part $Q_{ch}$ in the time domain. The multiplying unit 23h multiplies the correction parameter created in the correcting unit 23e by the real part $I_{ch}$. The multiplying unit 23i multiplies the correction parameter created in the correcting unit 23f by the imaginary part $Q_{ch}$.

<Effect>

As mentioned above, the wireless communication device 1 according to the second embodiment can obtain the effect of the following (3) in addition to the effects in (1) and (2) described in the first embodiment.

(3) A correction corresponding to a deviation occurring between a plurality of ADC units is possible.

In the case of the wireless communication device 1 according to the embodiment performing the MIMO communication as illustrated, there are two kinds of inputs: an input to the ADC units 13a and 13b and an input to the ADC units 23a and 23b. Similarly to the first embodiment, the timing mismatch at sampling occurs when converting the analog signals to the digital signals in the wireless communication device 1 in the MIMO communication. When there are many input systems as shown in FIG. 12, it is necessary to correct the timing in every input system for the number of converters. Especially, it is necessary to correct not only the imaginary part $Q_{ch}$ components but also the real number $I_{ch}$ components in the time domain in the receiving unit 23. This is because the correcting units 23e and 23f need to perform the correction depending on the timing deviation at sampling from the ADC unit 13a in the case where the timing that is a reference of the correction in the embodiment is set in the converter 13a.

The wireless communication device 1 according to the embodiment can correct the deviation described in the first embodiment by performing the correction depending on the deviation from the ADC unit that is a reference even when it is provided with a plurality of receiving units corresponding to the number of antennas. By performing the correction on the components corresponding to the real parts $I_{ch}$ in the time domain, a correction depending on the deviation of the analog signals transmitted and received between different antennas is possible.

The correction can be simultaneously performed on the deviation occurring in a plurality of ADC units by configuring the wireless communication device 1 according to the embodiment. Therefore, an increase in latency can be restrained.

There is a method for correcting the timing deviation at sampling between the antenna 10 and the antenna 20 by setting the new correcting unit after the combining circuit 23g. At this time, the receiving unit 23 can be configured similarly to the receiving unit 13 by abandoning the correcting unit 23e and the multiplying unit 23h.

The correcting units 13e, 23e, and 23f in the wireless communication device 1 according to the embodiment may include a function of performing the correction depending on the deviation in the amplitude and the phase besides the correction according to the timing deviation at sampling, similarly to the first embodiment.

Although the receiving units 13 and 23 in the wireless communication device 1 performing the MIMO communication have been described in the embodiment, the correction method in the first transmitting unit 12 and the second transmitting unit 22 is the same as the receiving units 13 and 23. It is necessary to align each timing of the analog signals supplied from the first transmitting unit 12 and the second transmitting unit 22. The correcting units included in the first transmitting unit 12 and the second transmitting unit 22 may have the function of performing the correction according to the deviation in the amplitude and the phase similarly to the above-mentioned first embodiment.

Third Embodiment

Figure 14:
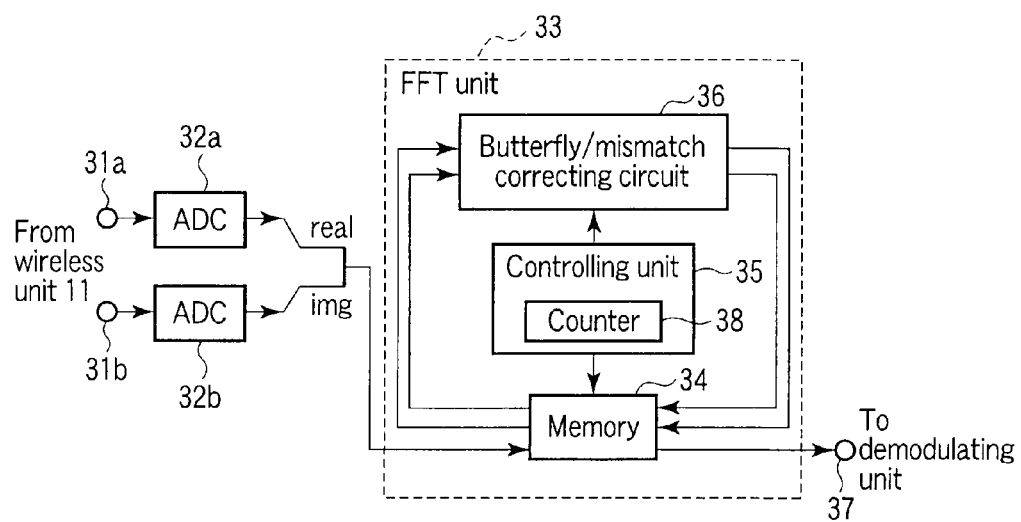
FIG. 14 is a block diagram of a wireless communication system according to a third embodiment of the invention.

Next, a wireless communication device according to a third embodiment will be described. The wireless communication device 1 according to the embodiment is shown in FIG. 14. FIG. 14 is a block diagram of a receiving unit of the wireless communication device 1 which performs the OFDM modulation according to the embodiment. The receiving unit of the wireless communication device 1 according to the embodiment includes input terminals 31a and 31b, ADC units 32a and 32b, a memory 34, a controlling unit 35, a butterfly/mismatch correcting circuit 36 (hereinafter, referred to as a shared circuit 36), an output terminal 37, and a counter 38.

A group of the shared circuit 36, the controlling unit 35, and the memory 34 shown in FIG. 14 works as the FFT units 13c and 23c, the separating circuits 13d and 23d, the correcting units 12g, 23g, and 23f, the multiplying units 13e, 23h, and 23i, and the combining circuits 13f and 23g (represented as the FFT unit 33 in the drawing) described in the first and second embodiments. The above structure may work also as the IFFT unit.

The structure of the receiving unit of the wireless communication device 1 according to the embodiment will be hereinafter described in details.

<Details of Receiving Unit>

<Input Terminals 31a and 31b>

The input terminal 31a supplies the in-phase components $i_{ch}$ of the input analog signals to the ADC unit 32a. The input terminal 31b supplies the quadrature components $q_{ch}$ of the input analog signals to the ADC unit 32b. The ADC units 32a and 32b perform the sampling on the input analog signals in every 40 [MHz].

<ADC Units 32a and 32b>

The ADC units 32a and 32b convert the analog signals supplied from the input terminals 31a and 31b into digital signals of the complex component. Namely, they convert the in-phase components $i_{ch}$ of the analog signals into the real parts $I_{ch}$ of the digital signals and the quadrature components $q_{ch}$ of the analog signals into the imaginary parts $Q_{ch}$ of the digital signals. The frequency components other than the communication channel used by the wireless communication device 1 are deleted from the real parts $I_{ch}$ and the imaginary parts $Q_{ch}$ of the digital signals, through the digital processing. Then, the signals sampled at 20 [MHz] are supplied from the ADC units 32a and 32b (for example, x+iv, x and v are real numbers, where $i^2=-1$) to the memory 34.

<Memory 34>

The memory 34 accumulates the digital signals having the complex components in every 64 points which are supplied from the ADC units 32a and 32b. The output frequencies from the ADC units 32a and 32b are 20 [MHz] similarly to the first and second embodiments. Namely, since they sample the signals at 20 [MHz], the time of accumulating the digital signals of the complex components for 64 points in the memory 34 is 3.2 [μsec]. Namely, when the digital signals of the complex components for 64 points are accumulated in the memory 34, the controlling unit 35 supplies the digital signals to the shared circuit 36, in every 3.2 [μsec], in order of applying the Fourier operation. After the Fourier operation of the digital signals in the shared circuit 36, the digital signals of the complex components for 64 points are accumulated again in the memory 34.

Then, in reply to an instruction of the controlling unit 35, the memory 34 supplies the Fourier-transformed digital signals to the shared circuit 36 (hereinafter, the shared circuit 36 will be referred to as a mismatch correcting circuit) working as the separating circuit, the correcting unit, and the combining circuit. Further, the digital signals are separated into the components corresponding to the real parts $I_{ch}$ and the imaginary parts $Q_{ch}$ in the time domain by the separating circuit, and then, the components corresponding to the imaginary parts $Q_{ch}$ are corrected by the correcting unit through a proper correction parameter. Further, after the components corresponding to the imaginary parts $Q_{ch}$, the digital signals for 64 points combined by the combining circuit are accumulated again from the shared circuit 36 into the memory 34.

<Counter 38>

The counter 38 counts the number of times of calculation of the digital signals supplied from the memory 34 in order to check whether they are calculated a necessary number of times in the shared circuit 36 working as the Fourier transformer. Namely, the counter 38 counts to check whether the multiplication of the digital signals for 6 stages has been completed in the shared circuit 36 working as the Fourier transformer described later. When the controlling unit 35 confirms that the counter 38 counts the above for six stages, the controlling unit 35 controls the shared circuit 36 to work as a mismatch correcting circuit.

<Controlling Unit 35>

When the digital signals for 64 points are accumulated in the memory 34, the controlling unit 35 switches the shared circuit 36 to work as the Fourier transformer. Then, the controlling unit 35 supplies the digital signals formed by each complex component from the memory 34 to the shared circuit 36 in order of the operation. When the counter 38 confirms that the digital signals for 64 points Fourier-transformed by the shared circuit 36 from the time domain to the frequency domain have been calculated for six stages, the controlling unit 35 switches the shared circuit 36 to work as the mismatch correcting circuit. Then, the controlling unit 35 controls the memory 34 to supply the digital signals to the shared circuit 36 working as the mismatch correcting circuit. The calculation in every stage will be described later.

<Shared Circuit 36>

The shared circuit 36 is controlled by the controlling unit 35 to work as a Fourier transformer or a mismatch correcting circuit using the time sharing.

When the shared circuit 36 works as the Fourier transformer, the controlling unit 35 controls the memory 34 to supply the digital signals (real parts $I_{ch}$ and imaginary parts $Q_{ch}$) of complex numbers. Then, the shared circuit 36 Fourier-transforms the digital signals from the time domain data to the frequency domain data. The shared circuit 36 accumulates the digital signals in the memory 34 again through the output terminals 48a and 48b. Concretely, the shared circuit 36 working as the Fourier transformer performs the butterfly calculation on all the digital signals $d_n$ (n is a real number, $0 \leq n \leq 63$) for 64 points supplied from the memory 34 in order of calculation. Namely, the shared circuit 36 pairs all the 64 points digital signals into 32 pairs and then, performs the butterfly calculation thereon. The calculation method will be described hereinafter.

As the calculation method, of the digital signals $d_n$, $d_0$ is paired with $d_{32}$, $d_1$ is paired with $d_{33}$, . . . , and $d_m$ is paired with $d_{(m+32)}$ ($0 \leq m \leq 31$, m: real number), so that a difference in the point number between the paired digital signals can be 32, hence to perform the butterfly calculation on these pairs. This butterfly calculation is regarded as a first stage.

Next, as a second stage, the shared circuit 36 pairs $d_0$ with $d_{16}$, $d_l$ with $d_{17}$, . . . , and $d_l$ with $d_{(l+16)}$ ($0 \leq l \leq 15$), in the digital signals calculated in the first stage, so that a difference in the point number between the paired digital signals can be 16, and then performs the butterfly calculation on them. Further, the shared circuit 36 pairs $d_{32}$ with $d_{48}$, $d_{33}$ with $d_{49}$, . . . , $d_p$ with $d_{(1+16)}$ as for the remaining digital signals ($32 \leq p \leq 47$) so that a difference in the point number between the paired digital signals can be 16 and then performs the butterfly calculation. In the butterfly calculation, m, l, and p are respectively regarded as point numbers, corresponding to the digital signals for 64 points. Similarly, the shared circuit 36 performs the calculation, changing the combination of the paired digital signals to be multiplied, until it comes to the six stages. Thus, the Fourier transform for the digital signals for 64 points is completed. When the counter 38 confirms the completion of the calculation for the six stages, the controlling unit 35 controls the shared circuit 36 to work as the mismatch correcting circuit. The positive and negative frequency components having the same absolute value, namely the expressions (11) and (12) are supplied from the memory 34 to the shared circuit 36. The shared circuit 36 separates the positive and negative frequency components corresponding to the subcarrier number 'k' ($-26 \leq k \leq 26$, $k \neq 0$) into the real part $I_{ch}$ and the imaginary part $Q_{ch}$ in the time domain.

Then, the multiplying unit 43 multiplies the proper correction parameter created by the correcting unit 44 by the component corresponding to the imaginary part $Q_{ch}$ in the time domain. The adder 45 adds the component corresponding to the real part $I_{ch}$ in the time domain to the component corresponding to the imaginary part $Q_{ch}$ in the corrected time domain. The added digital signal supplied from the output terminal 48a is supplied to the output terminal 37 through the memory 34. From the output terminal 48b, only the component corresponding to the imaginary part $Q_{ch}$ in the time domain, multiplied by the correction parameter, is supplied to the memory 34. The memory 34, however, abandons the digital signal, judging it as an invalid digital signal.

The detailed structure of the shared circuit 36 will be hereinafter described using FIG. 15. FIG. 15 is a block diagram of the shared circuit 36.

The shared circuit 36 includes input terminals 40a and 40b, adders 41a and 45, a subtracter 41b, imaginary part exchanging selectors 42a and 42b, a multiplying unit 43, a correcting unit 44, an output selector 48, switch instructing units 47, output terminals 48a and 48b, separating units 49a and 49b, and combining units 50a and 50b.

The input terminal 40a supplies the digital signals corresponding to the input real parts $I_{ch}$ respectively to the adder 41a and the subtracter 41b. The input terminal 40b supplies the digital signals corresponding to the input imaginary parts $Q_{ch}$ respectively to the adder 41a and the subtracter 41b.

The adder 41a adds the digital signals respectively supplied from the input terminals 40a and 40b and supplies the same to the separating unit 49a. The subtracter 41b subtracts the digital signals supplied from the input terminals 40a and 40b from each other and supplies the same to the separating unit 49b.

The separating unit 49a separates the digital signals supplied from the adder 41a into the real part and the imaginary part. The separating unit 49a supplies the real part component of the separated digital signal to the combining unit 50a as it is. The separating unit 49a supplies the imaginary part component of the separated digital signal to both the imaginary part exchanging selector 42a and the imaginary part exchanging selector 42b. The separating unit 49b separates the digital signal supplied from the subtracter 41b into the real part and the imaginary part. The separating unit 49b supplies the real part component of the separated digital signal to the combining unit 50b as it is. The separating unit 49b supplies the imaginary part component of the separated digital signal to both the imaginary part exchanging selector 42a and the imaginary part exchanging selector 42b.

The switch instructing unit 47 sets '0' in the respective imaginary part exchanging selectors 42a and 42b upon receipt of the input signal '0' from the controlling unit 35. The switch instructing unit 47 sets '1' in the respective imaginary part exchanging selectors 42a and 42b upon receipt of the input signal '1' from the controlling unit 35.

Upon receipt of the input signal '0' from the switch instructing unit 47, the imaginary part exchanging selector 42a supplies only the imaginary part component supplied from the separating unit 49a, of the imaginary part components supplied from the separating unit 49a and the separating unit 49b, to the combining unit 50a. Upon receipt of the input signal '1' from the switch instructing unit 47, the imaginary part exchanging selector 42a supplies the imaginary part component supplied from the separating unit 49b, of the imaginary part components supplied from separating unit 49a and the separating unit 49b, to the combining unit 50b.

Upon receipt of the input signal '0' from the switch instructing unit 47, the imaginary part exchanging selector 42b supplies the imaginary part component supplied from the separating unit 49b, of the imaginary part components supplied from the separating unit 49a and the separating unit 49b, to the combining unit 50b. Upon receipt of the input signal '1' from the switch instructing unit 47, the imaginary part exchanging selector 42b passes the imaginary part component supplied from the separating unit 49a, of the imaginary part components supplied from the separating unit 49a and the separating unit 49b, and supplies the above to the combining unit 50a.

The combining unit 50a combines the real part component supplied from the separating unit 49a and the imaginary part component supplied from the imaginary part exchanging selector 42a, into the digital signal of the complex number. Then, the combining unit 50a supplies the digital signal to the adder 45 and the output selector 48. The combining unit 50b combines the real part component supplied from the separating unit 49b and the imaginary part component supplied from the imaginary part exchanging selector 42b into the digital signal of the complex number. Then, the combining unit 50b supplies the digital signal to the multiplying unit 43.

When the shared circuit 36 is switched as the Fourier transformer by the controlling unit 35, the correcting unit 44 creates a rotation parameter necessary for the Fourier operation as for the digital signal supplied from the combining unit 50b. When the controlling unit 35 switches the shared circuit 36 as the mismatch correcting circuit, the correcting unit 44 creates a correction parameter on the digital signal supplied from the combining unit 50b, according to the deviation described in the first and second embodiments.

The multiplying unit 43 multiplies the digital signal supplied from the combining unit 50b by the rotation parameter or the correction parameter created by the correcting unit 44. The adder 45 adds the digital signal supplied from the combining unit 50a to the digital signal multiplied by the multiplying unit 43. The adder 45 supplies the added digital signal to the output selector 48.

The output selector 48 supplies the digital signal supplied from the combining unit 50a or the digital signal added in the adder 45. The supplied digital signal is switched by the input signal from the switch instructing unit 47. The output selector 48 supplies the digital signal supplied from the combining unit 50a upon receipt of the input signal '0' from the switch instructing unit 47. The output selector 48 supplies the digital signal supplied from the adder 45 upon receipt of the input signal '1' from the switch instructing unit 47.

When the shared circuit 36 works as the Fourier transformer, the output terminals 48a and 48b supply the butterfly-calculated digital signal. When the shared circuit 36 works as the mismatch correcting circuit, only the output terminal 48a supplies the mismatch-corrected digital signal.

When the shared circuit 36 works as the Fourier transformer, the adder 41a and the subtracter 41b work as the butterfly calculating unit. The butterfly calculating unit is a radix-2 butterfly circuit including two input/output terminals.

As mentioned above, the controlling unit 35 causes the FFT unit 33 to work as the circuit which performs the correction according to the deviation of the sampling, the amplitude, and the phase through the time sharing described in the first and second embodiments by adopting the time sharing to the wireless communication device according to the embodiment.

In other words, by adopting the time sharing to the wireless communication device 1 according to the embodiment, the butterfly calculating unit can be applied to the mismatch correcting circuit which corrects the deviation of the timing, the amplitude, and the phase.

<Operation of Wireless Base Station 1>

Figure 16:
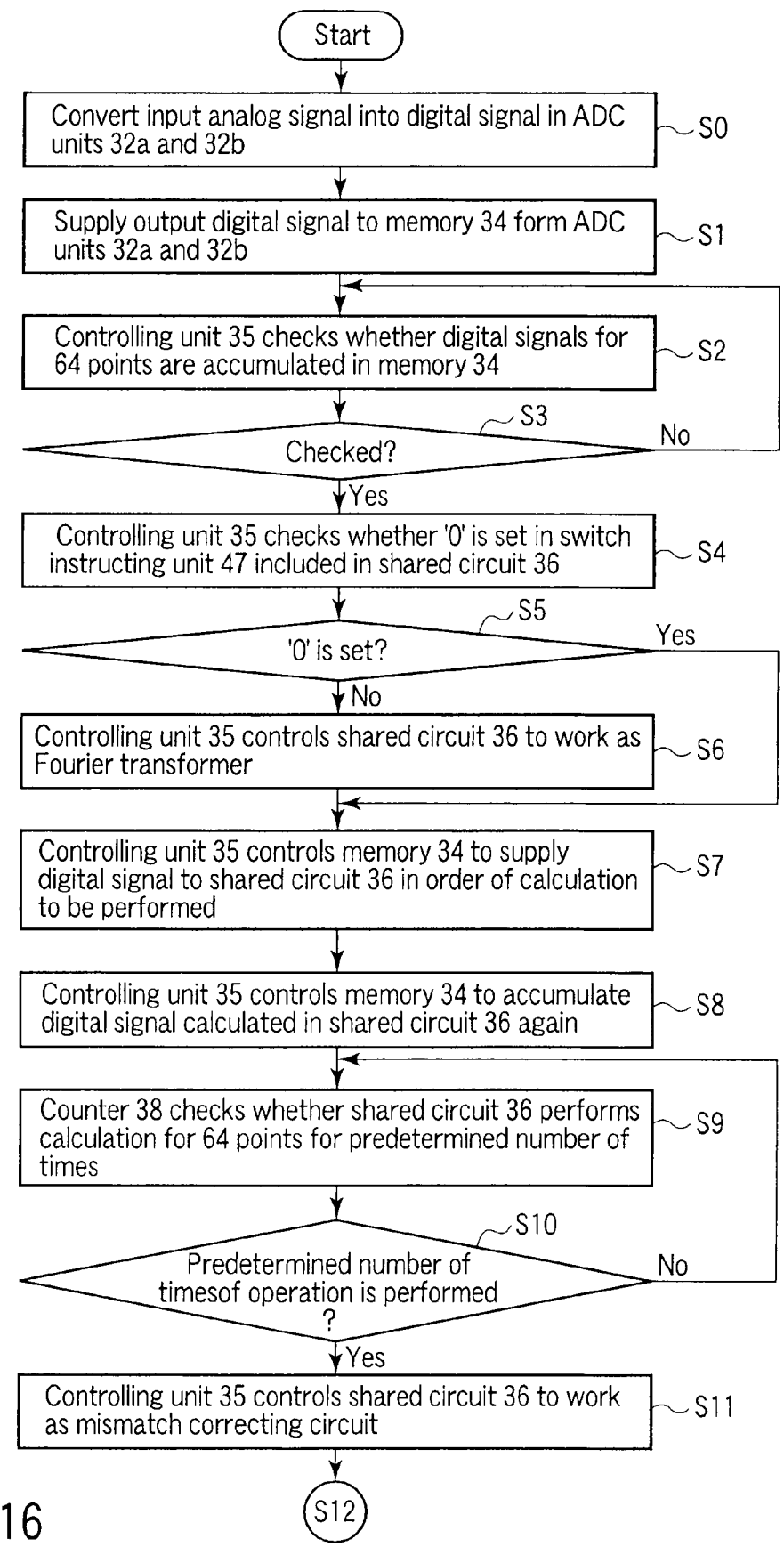
FIGS. 16 and 17 are flow charts showing an operation of the wireless communication device according to the third embodiment of the invention.
Figure 17:
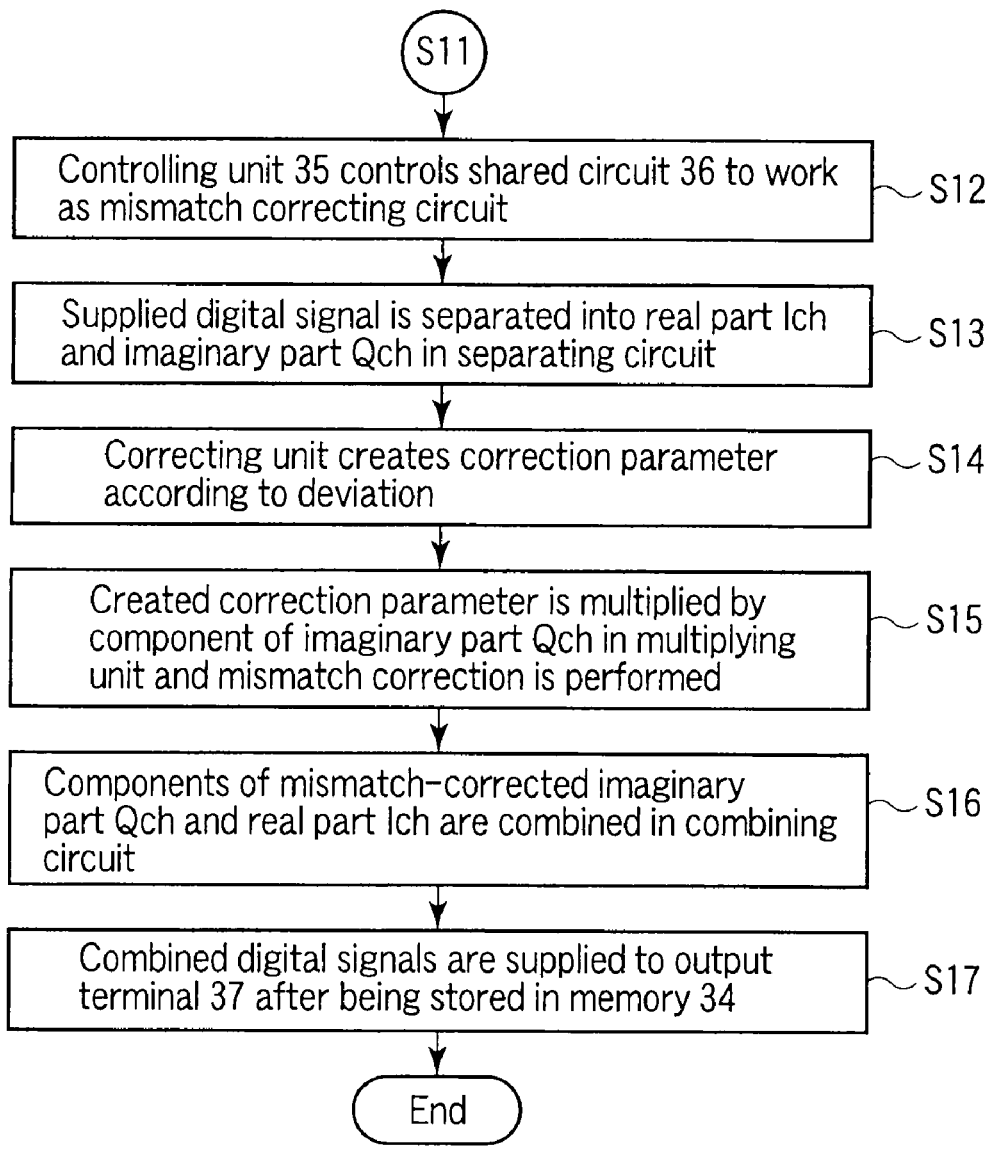

Next, the operation in the wireless communication device 1 according to the embodiment, especially about the receiving unit shown in FIGS. 14 and 15, will be described with reference to FIGS. 16 and 17. FIGS. 16 and 17 are the flow charts showing the flow of the operation of the wireless base station 1. Hereinafter, though the operation of the base station 1 will be described as an example, the operations of the terminals 2 and 3 are the same.

The ADC units 32a and 32b sample the 40 [MHz] band width of the analog signals of the input in-phase components $i_{ch}$ and quadrature components $q_{ch}$ at 40 [MHz] and then eliminate the adjacent channel ±10 [MHz] bands on the both sides of the first communication channel. After converting the first communication channel into the sampling of 20 [MHz], it is converted into the digital signals (real parts $I_{ch}$ and imaginary parts $Q_{ch}$) of the complex numbers (Step S0, FIG. 16).

The digital signals of the complex numbers supplied from the ADC units 32a and 32b are supplied to the memory 34 (S1). The controlling unit 35 checks whether the digital signals for 64 points are accumulated in the memory 34 (S2). In Step S2, when the digital signals for 64 points are not accumulated in the memory 34 (NO, S3), the controlling unit 35 stands by until the digital signals for 64 points converted in the ADC units 32a and 32b are accumulated in the memory 34 (NO, S3).

In Step S3, when the controlling unit 35 confirms that the digital signals for 64 points have been accumulated in the memory 34 (YES, S3), the controlling unit 35 checks whether the input signal '0' is set in the switch instructing unit 47 included in the shared circuit 36 (S4). When '0' is not set in the switch instructing unit 47 as the result of Step S4 (NO, S5), the controlling unit 35 causes the shared circuit 36 to work as the Fourier transformer. Namely, the input signal '0' is supplied to the imaginary part exchanging selectors 42a and 42b and the output selector 46 by setting the switch instructing unit 47 included in the shared circuit 36. Further, it controls the correcting unit 44 to create a rotation parameter necessary for the butterfly calculation (S6).

Then, the controlling unit 35 supplies the digital signals from the memory 34 to the shared circuit 36 in order of calculation to be performed (S7). When '0' is set in the input signal as the result of Step S4 (YES, S5), the processing of Step S7 is performed.

The digital signals supplied to the shared circuit 36 in order of calculation to be performed are operated by the shared circuit 36 and stored again in the memory 34 (S8). In Step S8, the counter 38 counts the number of times of the butterfly calculation of the digital signals in the shared circuit 36 (S9). When the controlling unit 35 judges that the count number in the counter 38 does not meet six times as the result of Step S9 (NO, S10), the controlling unit 35 stands by until the butterfly calculation is performed six times in the shared circuit 36 and the Fourier transform is completed (NO, S10). When the controlling unit 35 judges that the butterfly calculation is performed six times in the shared circuit 36, according to the count number in the counter 38 (YES, S10), the controlling unit 35 causes the shared circuit 36 to work as the mismatch correcting circuit. By inputting the input signal '1' into the switch instructing unit 47 included in the shared circuit 36, the input signal '1' is set in the imaginary part exchanging selectors 42a and 42b and the output selector 46. Further, it controls the correcting unit 44 to create a parameter according to the deviation described in the first and second embodiments (S11).

After Step S11, the controlling unit 35 supplies each pair of the positive and negative frequency components having the same absolute value from the memory 34 to the shared circuit 36 (S12, FIG. 17). In Step S12, the digital signals supplied to the shared circuit 36 are separated into the real part $I_{ch}$ and the imaginary part $Q_{ch}$ in the time domain in the butterfly calculating unit working as the separation circuit (S13).

In Step S13, the correcting unit 44 creates a parameter according to the sampling deviation and the deviation of the amplitude and the phase caused by the parasitic capacity depending on the frequency 'fk' as for the separated imaginary part $Q_{ch}$ (S14). As the result of Step S14, the created parameter is multiplied by the imaginary part $Q_{ch}$ in the time domain in the multiplying unit 43 and the mismatch correction is performed (S15). The components corresponding to the imaginary part $Q_{ch}$ and the real part $I_{ch}$ in the time domain with the mismatch correction performed thereon in Step S15 are combined by using the adder 45 and the output selector 48 (S16). After the mismatch correction in Steps S15 and S16, the combined digital signals are accumulated in the memory 34 again through the output terminal 48a and supplied to the output terminal 37 (S17).

As mentioned above, the wireless communication device 5 according to the embodiment can obtain the following effect (4) in addition to the effects (1) to (3) described in the first and second embodiments.

<Effect>

(4) The circuit size can be reduced further and the flexible circuit design is possible.

In comparison with the wireless communication device 1 according to the first and second embodiments, the circuit size can be reduced further.

In the wireless communication device 5 according to the embodiment, by using the time sharing in the butterfly calculating unit used for the Fourier transform, it can be applied to the mismatch correcting circuit, hence to share the circuit. When the shared circuit 36 works as the mismatch correcting circuit, the butterfly calculating unit works as a part of the separating circuit which separates into the real part $I_{ch}$ and the imaginary part $Q_{ch}$ in the time domain. The correcting unit 44 works as a part of the mismatch correcting circuit which creates a proper parameter corresponding to the sampling deviation and the deviation of the amplitude and the phase as described in the first to third embodiments. Further, the adder 45 and the output selector 46 work as the combining circuit.

The Fourier-transform of the shared circuit 36 and the switching of the mismatch correcting circuit are performed by using only the control signal from the controlling unit 35 and just by supplying the input signal '0' or '1' to the switch instructing unit 47. The switch instructing unit 47 supplies the input signal supplied from the controlling unit 35 to the imaginary part exchanging selectors 42a and 42b and the output selector 46.

As mentioned above, in the wireless communication device according to the embodiment, the correcting circuit which copes with a correction of various deviations other than the sampling deviation and the deviation of the amplitude and the phase in the ADC unit can be provided in the FFT unit 33.

Though the wireless communication device according to the embodiment has been described with reference to the radix-2 butterfly calculating unit for the sake of easy description, the radix-4 butterfly calculating unit may be used. Because the radix-4 butterfly calculating unit includes more adders and multiplying units than the radix-2 butterfly calculating unit, it can perform the correction of two subcarriers through one calculation. Further, since the radix-4 butterfly calculating unit can be shared with the adder working as the combining circuit, the circuit design having a high flexibility can be realized.

Although the structure and the operation of the receiving unit especially in the case of including one antenna has been described in the wireless communication device according to the embodiment, they can be used in the MIMO communication described in the second embodiment. In this case, the correcting unit 44 included in the FFT unit 33 shown in FIG. 15 needs to create a parameter according to the signal that is a reference of the sampling, the amplitude, and the phase as described in the second embodiment.

Fourth Embodiment

Figure 18:
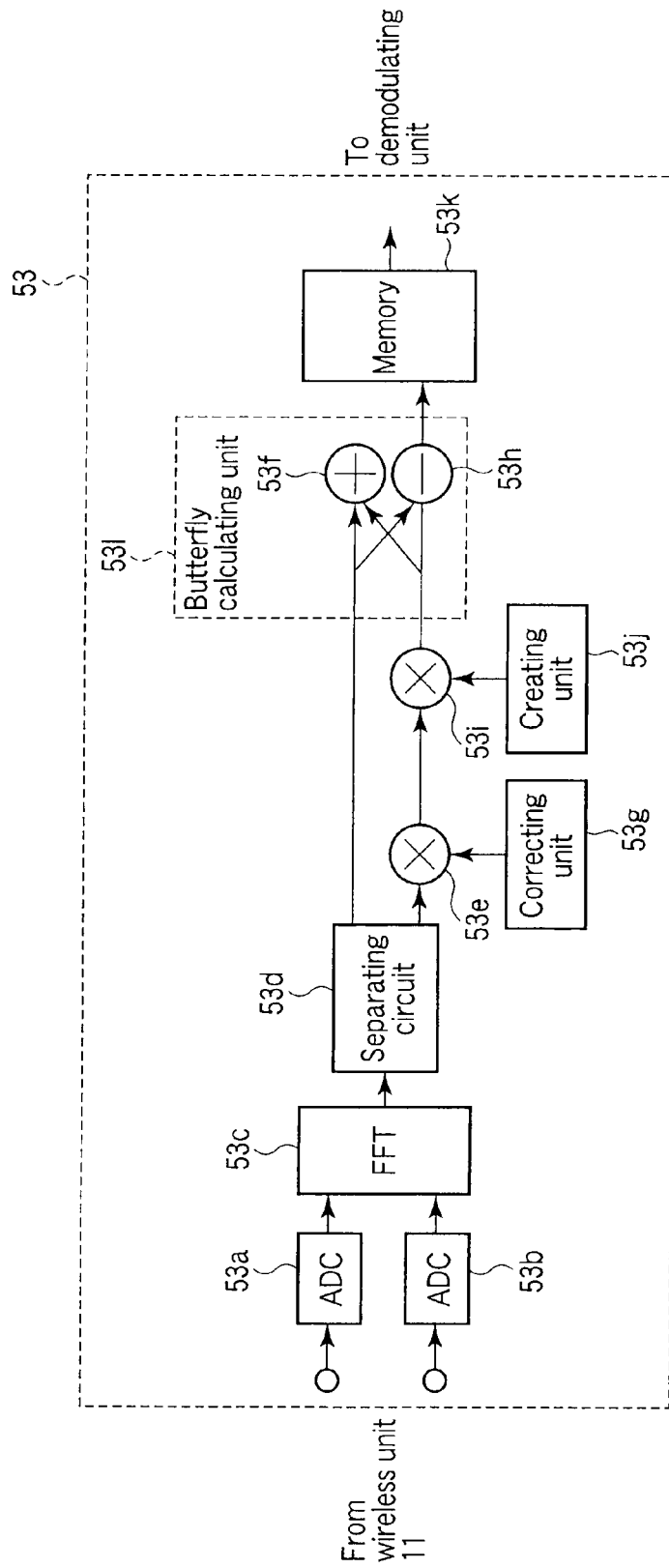
FIG. 18 is a block diagram showing an example of a receiving unit in a wireless communication device according to a fourth embodiment of the invention.

A wireless communication device according to a fourth embodiment of the invention will be described. A receiving unit of the wireless communication device 1 according to the embodiment will be described in FIG. 18. FIG. 18 is a block diagram of the receiving unit 53 of the wireless communication device 1 which performs the OFDM modulation according to the embodiment, showing the structure for realizing the double speed sampling using the real number. The antenna 10 and the transmitting unit 12 in the wireless communication device 1 according to the embodiment have the same structures as those of FIG. 5 according to the first embodiment and description thereof is omitted. The wireless unit 11 also has almost the same structure but it has a function for performing the interleave AD. Hereinafter, the wireless unit 11 and the receiving unit 53 in the wireless communication device 1 according to the embodiment will be described.

<Wireless Unit 11>

After down-converting the analog signals received through the antenna 10 to the medium frequencies, the wireless unit 11 supplies them to the ADC units 53a and 53b. Namely, the wireless unit 11 down-converts a first communication channel that uses the communication band in the range of 10 [MHz] on the side of high frequency and 10 [MHz] on the side of low frequency around a [MHz] in the center, at (a−10) [MHz]. The first communication channel is converted into analog signals of medium frequencies from 0 [MHz] to +20 [MHz] and the signals are supplied to the receiving unit 53.

In the above first to third embodiments, the wireless unit 11 has two systems of analog input to the receiving unit including in-phase component and quadrature component, while the wireless unit 11 in this embodiment has only one system of analog input to the receiving unit 53. In short, the same analog signals are input to a plurality of ADC units.

<Receiving Unit 53>

The receiving unit 53 adopts the interleave AD including a plurality of ADC units with respect to one analog input signal. The receiving unit 53 samples the signal at 40 [MHz] and converts it into frequency domain data through the 128 points Fourier transform. In order to realize the double speed sampling in this embodiment, the receiving unit 53 is provided with two ADC units. Hereinafter, the structure of the receiving unit will be described. In order to realize the three times sampling, it has to be provided with three ADC units.

The receiving unit 53 includes ADC units 53a and 53b, an FFT unit 53c, a separating circuit 53d, a correcting unit 53g, a creating unit 53j, multiplying units 53e and 53i, a butterfly calculating unit 53l, and a memory 53k.

As illustrated, the receiving unit 53 of the wireless communication device 1 according to the embodiment is different from the structure of FIG. 6 described in the above first embodiment in that it abandons the combining circuit 13f and is newly provided with the creating unit 53j, the multiplying unit 53i, the butterfly calculating unit 53l, and the memory 53k. The butterfly calculating unit 53l includes an adder 53f and a subtracter 53h. The ADC units 53a and 53b, the FFT unit 53c, the separating circuit 53d, the correcting unit 53g, and the multiplying unit 53e have almost the same structures as those of FIG. 6 but they have each function of realizing the double speed sampling. The other components are the same as those of the first embodiment and description thereof is omitted.

<Details of Receiving Unit 53>

The ADC units 53a and 53b, the FFT unit 53c, the separating circuit 53d, the correcting unit 53g, the butterfly calculating unit 53l, the multiplying units 53e and 53i, the creating unit 53j, and the memory 53k will be described hereinafter.

<ADC Units 53a and 53b>

The ADC units 53a and 53b are AD converters forming interleave AD each having two interleaves. Namely, the ADC units 53a and 53b realize the double speed sampling. The interleave AD samples the signal at 40 [MHz] similarly to the above first to third embodiments, but each of the AD converters or each of the ADC units 53a and 53b samples the signal at 20 [MHz].

The ADC unit 53a samples the input analog signals, for example, at the timing of even number (t=0, 50, 100, 150, . . . , 25×2n [nsec], n is a natural number).

The ADC unit 53b samples the input analog signals, for example, at the timing of odd number (t=25, 75, 125, 175, . . . , 25×(2n+1) [nsec], n is a natural number).

Further, the signal converted from analog to digital by the ADC unit 53b is multiplied by i ($i^2=-1$), hence to make the digital signal the component of the imaginary part. Namely, the real part component and the imaginary part component of the digital signal supplied from the ADC units 53a and 53b are combined in every sampling timing and supplied to the FFT unit 53c. In the receiving unit 53 according to the embodiment, the digital signals are combined in every sampling timing and supplied to the FFT unit 53c, but also in the ADC units 53a and 53b, there may occur the above-mentioned deviation for the reason described in the first embodiment.

<FFT Unit 53c>

The FFT unit 53c Fourier-transforms the odd and even digital signals sampled alternately by the ADC units 53a and 53b. The FFT unit 53c receives the digital signals sampled by the ADC unit 53a at the even timing and the digital signals sampled by the ADC unit 53b at the odd timing. The FFT unit 53c Fourier-transforms the respectively received digital signals for 64 points.

<Separating Circuit 53d>

The separating circuit 53d separates the digital signals converted from the time domain to the frequency domain by the FFT unit 53c into the real part $I_{ch}$ and the imaginary part $Q_{ch}$ in the time domain. Namely, the component corresponding to the real part $I_{ch}$ separated by the separating circuit 53d is obtained by the FFT unit 53c Fourier-transforming the digital signals for 64 points sampled by the ADC unit 53a at the even timing, while the component corresponding to the imaginary part $Q_{ch}$ is obtained by the FFT unit 53c Fourier-transforming the digital signals for 64 points sampled by the ADC unit 53b at the odd timing. The separating circuit 53d supplies the separated component corresponding to the real part $I_{ch}$ in the time domain to the butterfly calculating unit 53l. The separating circuit 53d supplies the separated component corresponding to the imaginary part $Q_{ch}$ in the time domain to the multiplying unit 53e.

<Correcting Unit 53g and Multiplying Unit 53e>

The correcting unit 53g and the multiplying unit 53e which perform a correction according to the deviation will be described next. The sampling timing of the ADC unit 53a has to be deviated from that of the ADC unit 53b ideally by 25 [nsec]. When the actual timing deviation between the ADC units 53a and 53b is far from the ideal value, it has to be corrected.

The correcting unit 53g supplies to the multiplying unit 53e, a correction parameter according to a deviation between the ideal deviation and the actual deviation and the subcarrier number 'k' of the digital signal supplied from the separating circuit 53d.

The multiplying unit 53e is a complex multiplying unit, which multiplies the digital signal supplied from the separating circuit 53d by the correction parameter supplied from the correcting unit 53g and supplies it to the creating unit 53j.

<Creating Unit 53j, Multiplying Unit 53i, and Butterfly Calculating Unit 53l>

The creating unit 53j creates a rotation parameter necessary for the Fourier transform. It creates a rotation parameter depending on a point number, or 'k' of the digital signal supplied from the multiplying unit 53e and supplies it to the multiplying unit 53i.

The multiplying unit 53i receives the digital signals Fourier-transformed by the FFT unit 53c, which signals for 64 points are sampled by the ADC unit 53b at the odd timing, from the multiplying unit 53e.

The butterfly calculating unit 53l receives the digital signals Fourier-transformed by the FFT unit 53d, which signals for 64 points are sampled by the ADC unit 53a at the even timing, from the separating circuit 53d.

The above creating unit 53j, multiplying unit 53i, and butterfly calculating unit 53l perform the butterfly calculation on the received digital signals and combine them in the 128 points Fourier transform.

The above calculation will be more specifically described by using the following expressions. The digital signals sampled by the ADC units 53a and 53b are defined as f(t) ($0 \leq t < 128$, t is an integer) in order of time series. The digital signals in the even numbers (t=2t', $0 \leq t' < 64$, t' is an integer) are sampled by the ADC unit 53a and the digital signals in the odd numbers (t=2t'+1, $0 \leq t' < 64$, t' is an integer) are sampled by the ADC unit 53b. When the result of the 128 points Fourier transform of f(t) is defined as F(k) ($0 \leq k < 128$, k is an integer), the expression of the Fourier transform is as follows.

$$F(k) = \sum_{t=0}^{127} f(t) \exp\left(\frac{2\pi i k t}{128}\right) \quad (26)$$

The expression (26) can be expressed as follows by dividing t into even number and odd number.

$$F(k) = \sum_{t'=0}^{63} \left\{ \begin{array}{l} f(2t')\exp\left(\frac{2\pi i k t'}{64}\right) + \\ \exp\left(\frac{2\pi i k}{128}\right) f(2t'+1)\exp\left(\frac{2\pi i k t'}{64}\right) \end{array} \right\} \quad (27)$$

Here, when the result of the 64 points Fourier transform of the even-numbered digital signals is defined as G(k') and the result of the 64 points Fourier transform on the odd-numbered digital signals is defined as H(k') ($0 \leq k' < 64$), the expression of the Fourier transform is as follows.

$$G(k') = \sum_{t'=0}^{63} f(2t')\exp\left(\frac{2\pi i k' t'}{64}\right) \quad (28)$$

$$H(k') = \sum_{t'=0}^{63} f(2t'+1)\exp\left(\frac{2\pi i k' t'}{64}\right) \quad (29)$$

When the expressions (28) and (29) are used to express the expression (27), the following expression is satisfied as for k' that satisfies $0 \leq k' < 64$.

$$F(k') = G(k') + H(k')\exp\left(\frac{2\pi i k'}{128}\right) \quad (30)$$

By substituting k=64+k' for the expression (27) and using the expressions (28) and (29), as for 'k' that satisfies $64 \leq k < 128$, it can be expressed as follows.

$$F(64+k') = G(k') - H(k')\exp\left(\frac{2\pi i k'}{128}\right) \quad (31)$$

The creating unit 53*j*, the multiplying unit 53*i*, and the butterfly calculating unit 53*l* supply the 128 points Fourier transform result F(k) based on the expressions (30) and (31), according to the digital signal G(k') from the separating circuit and the digital signal H(k') from the multiplying unit 53*e*.

The creating unit 53*j* creates a rotation parameter exp (2πik'/128) according to the point number 'k', as for the digital signal G(k') supplied from the multiplying unit 53*e* and supplies it to the multiplying unit 53*i*.

The multiplying unit 53*i* supplies the result H(k')exp(2πik'/128) of multiplying the digital signal H(k') supplied from the multiplying unit 53*e* by the rotation parameter supplied from the creating unit 53*j* to the butterfly calculating unit 53*l*.

The adder 53*f* in the butterfly calculating unit 53*l* adds the digital signal G(k') from the separating circuit 53*d* to the digital signal H(k')exp(2πik'/128) from the multiplying unit 53*i*, hence to supply the digital signal whose point number k is less than 64, of the 128 points Fourier operation result, to the memory 53*k*, according to the expression (30).

The subtracter 53*h* in the butterfly calculating unit 53*l* subtracts the digital signal H(k')exp(2πik'/128) from the multiplying unit 53*i* from the digital signal G(k') from the separating circuit 53*d*, hence to supply the digital signal whose point number k is 64 and more, of the 128 points Fourier transform, to the memory 53*k*, according to the expression (31).

<Memory 53*k*>

The memory 53*k* supplies the digital signals supplied from the adder 53*f* and the subtracter 53*h* to a demodulator not illustrated.

<Effect>

As mentioned above, the wireless communication device according to the embodiment can achieve the following effect (5) in addition to the effects (1) to (4) described in the first to third embodiments.

(5) By providing the structure of interleave AD, double speed sampling is enabled.

The wireless communication device using the interleave AD is provided with a plurality of ADC units as for one analog input and adopts a method in which a plurality of converters sample the signals at each timing when converting analog signals into digital signals, thereby realizing a high-speed sampling several times higher than that achieved by only one ADC. In the conventional art, the interleave AD is adopted to speed up the sampling; however, there necessarily occurs a deviation in timing according to higher integration and lower power consumption in a circuit, which requires correction. Namely, in order to cope with the problem, in the wireless communication device related to the conventional art, a timing deviation in the sampling has been corrected by adjusting a tap coefficient with a digital filter. In this case, however, the conventional problems cannot be solved because the circuit size of the digital filter and the power consumption are large. Alternatively, there is a method of correcting the deviation by using a plurality of Fourier transformers. Also, in this case, however, not only the circuit size but also the power consumption becomes larger.

Differently from the above, according to the structure of the receiving unit according to the embodiment, since no digital filter has to be used, the circuit size is not enlarged and the double speed sampling by the interleave AD is enabled. In the embodiment, the ADC units 53*a* and 53*b* sample the analog signals alternately at the regular timings as shown in FIG. 18. Specifically, for example, the ADC unit 53*a* samples the analog signals at the even timings while the ADC unit 53*b* samples them at the odd timings. The FFT unit 53*c* Fourier-transforms the sampled digital signals in 64 points. The components respectively corresponding to the real part $I_{ch}$ and the imaginary part $Q_{ch}$ in the time domain, separated by the separating circuit 53*d* are respectively 64 points digital signals. Specifically, there are the digital signals sampled at the even timings for 64 points and the digital signals sampled at the odd timings for 64 points.

By calculating the respective 64 points digital signals in the butterfly calculating unit as mentioned above, the digital signals for 128 points are created. In short, the wireless communication device according to the embodiment can achieve the double speed sampling by one FFT unit 53*c*.

Further, the wireless communication device 1 according to the embodiment needs only one Fourier transformer 13*c* by arranging the separating circuit 13*d* after the Fourier transformer 13*c*, differently from the conventional structure using two Fourier transformers. Further, the wireless communication device 1 according to the embodiment does not use a digital filter. This embodiment can thus reduce the circuit size and the power consumption.

In the effect shown in (5), the effect especially in the receiving unit 13 has been described but it is obvious that also the transmitting unit 12 needs only one inverse Fourier transformer 12*c* according to FIG. 11. Specifically, as shown in FIG. 11, by providing the combining circuit 12*d* before the inverse Fourier transformer 12*c*, the combining circuit 12*d* combines the digital signals of the real part $I_{ch}$ component and the imaginary part $Q_{ch}$ component in the time domain separated by the separating circuit 12*f*. Thus, also the transmitting unit 12 needs only one inverse Fourier transformer 12*c*, hence to reduce the circuit size and the power consumption.

Fifth Embodiment

Next, a wireless communication device according to a fifth embodiment of the invention will be described. The wireless communication device 1 according to the embodiment is shown in FIG. 19. FIG. 19 is a block diagram of the wireless communication device 1 performing the OFDM modulation according to this embodiment, showing the structure of realizing the double speed sampling using the complex number. In the fifth embodiment, similarly to the first to third embodiments, the wireless unit 11 down-converts a first communication channel for use in the band from (a−10) [MHz] to (a+10) [MHz] to the frequency of a [MHz] and supplies the input analog signals of two in-phase component/quadrature component to a receiving unit. Namely, the wireless communication device 1 according to the embodiment adopts an interleave AD including a plurality of ADC units for each in-phase component/quadrature component of the analog signals received through one antenna. In this embodiment, each receiving unit includes two ADC units in order to realize the double speed sampling with complex number.

<Wireless Communication Device 1>

The wireless communication device 1 shown in FIG. 19 includes a third receiving unit 63, a fourth receiving unit 73, a butterfly calculating unit 64, a creating unit 65, a multiplying unit 66, and a memory 67, instead of the antenna 20, the second wireless unit 21, the first receiving unit 13, the second receiving unit 23, and the second transmitting unit 22 in the wireless communication device 1 according to the second embodiment. In the wireless communication device 1 according to the embodiment, the third receiving unit 63 and the fourth receiving unit 73 perform the double speed sampling by sampling the input analog signals alternately at the timing of, for example, even number and odd number. As the other structures are the same as those of the first and second embodiments, description thereof is omitted.

<Details of Wireless Communication Device 1>

Figure 20:
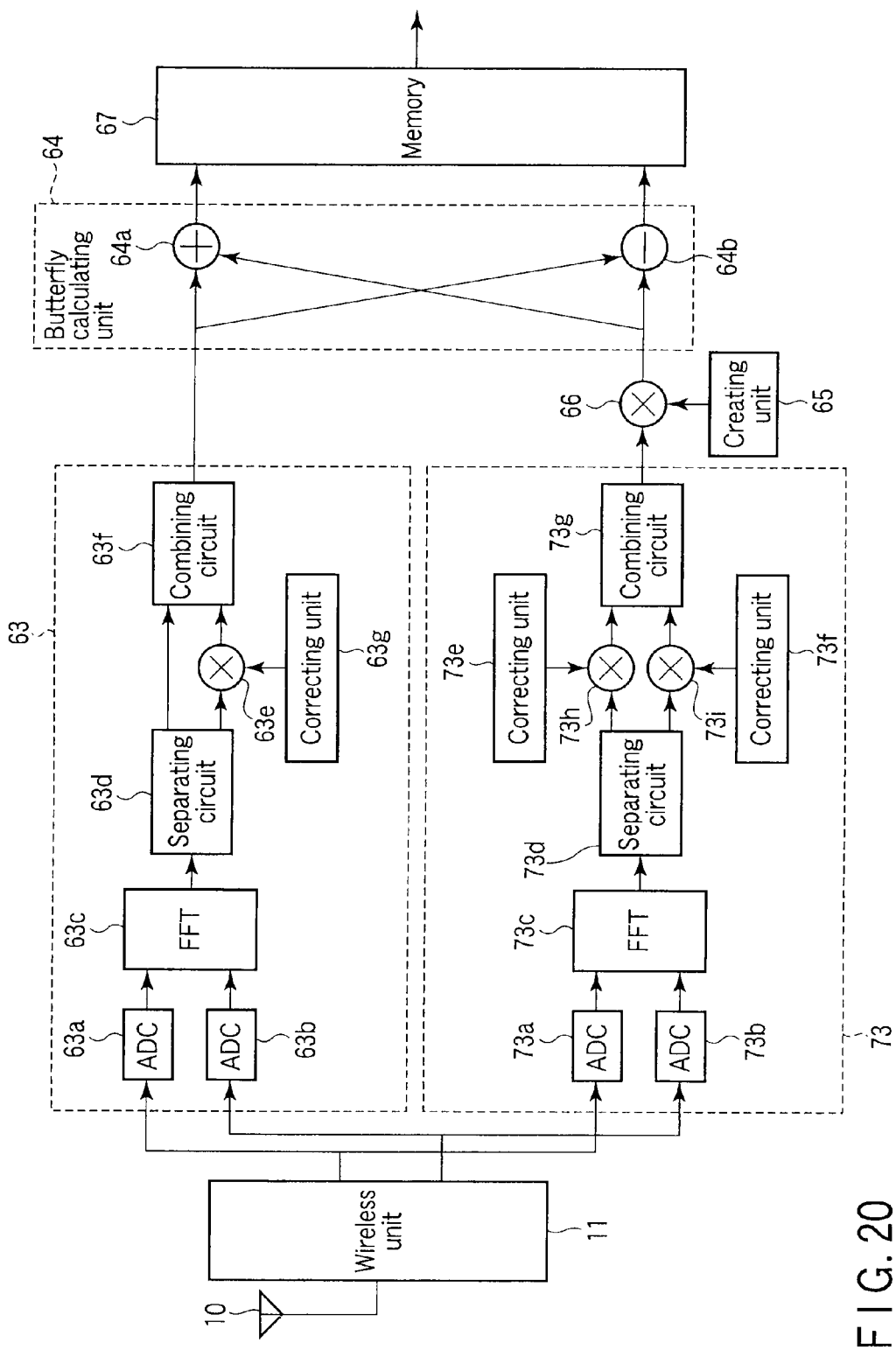
FIG. 20 is a block diagram showing an example of a wireless communication device according to a fifth embodiment of the invention.

Next, the detailed structures of the third receiving unit 63, the fourth receiving unit 73, the butterfly calculating unit 64, the creating unit 65, the multiplying unit 66, and the memory 67 will be described using FIG. 20. FIG. 20 is a block diagram of the third receiving unit 63, the fourth receiving unit 73, the butterfly calculating unit 64, the creating unit 65, the multiplying unit 66, and the memory 67 included in the wireless communication device 1 according to the embodiment.

The third receiving unit 63 according to the embodiment includes ADC units 63*a* and 63*b*, an FFT unit 63*c*, a separating circuit 63*d*, a multiplying unit 63*e*, a correcting unit 63*g*, and a combining circuit 63*f*.

Each of the FFT unit 63*c*, the separating circuit 63*d*, and the combining circuit 63*f* included in the third receiving unit 63 has the same structure as each of the FFT unit 13*c*, the separating circuit 13*d*, and the combining circuit 13*f* in FIG. 13 according to the second embodiment but the third receiving unit 63 works together with the fourth receiving unit 73, hence to realize the double speed sampling.

The fourth receiving unit 73 includes ADC units 73*a* and 73*b*, an FFT unit 73*c*, a separating circuit 73*d*, multiplying units 73*h* and 73*i*, correcting units 73*e* and 73*f*, and a combining circuit 73*g*.

Each of the FFT unit 73*c*, the separating circuit 73*d*, and the combining circuit 73*g* included in the fourth receiving unit 73 has the same structure as each of the FFT unit 23*c*, the separating circuit 23*d*, and the combining circuit 23*g* in FIG. 13 according to the second embodiment but it works together with the third receiving unit 63, hence to realize the double speed sampling.

The butterfly calculating unit 64 includes an adder 64*a* that performs addition and a subtracter 64*b* that performs subtraction as for the digital signals supplied from the third receiving unit 63 and the multiplying unit 66.

The memory 67 supplies the digital signals supplied from the butterfly calculating unit 64 to a demodulator not illustrated. As the other components are the same in structure and function, description thereof is omitted here.

Hereinafter, the wireless unit 11, the ADC units 63*a*, 63*b*, 73*a*, and 73*b*, the FFT units 63*c* and 73*c*, the separating circuits 63*d* and 73*d*, the combining circuits 63*f* and 73*g*, the butterfly calculating unit 64, the creating unit 65, the multiplying unit 66, and the memory 67 will be described.

<ADC Units 63*a*, 63*b*, and ADC units 73*a*, 73*b*>

In the embodiment, the analog signals received by the wireless unit 11 and separated in the in-phase components $i_{ch}$ and the quadrature components $q_{ch}$ are supplied to the ADC units 63*a* and 63*b* and the ADC units 73*a* and 73*b*. Specifically, the in-phase components $i_{ch}$ of the analog signals are supplied from the wireless unit 11 to the ADC units 63*a* and 73*a*, while the quadrature components $q_{ch}$ Of the analog signals are supplied from the wireless unit 11 to the ADC units 63*b* and 73*b*. In short, the ADC units 63*a* and 63*b* receive the same analog signals and the ADC units 73*a* and 73*b* receive the same analog signals.

As mentioned above, the sampling by the ADC units 63*a* and 63*b* and the sampling by the ADC units 73*a* and 73*b* are performed alternately at a timing of regular intervals. As described in the fourth embodiment, for example, the ADC units 63*a* and 63*b* perform the sampling at the same time at the timing of even number, while the ADC units 73*a* and 73*b* perform the sampling at the same time at the timing of odd number.

The ADC units 63*a* and 63*b* supply the respective components corresponding to the real part $I_{ch}$ and the imaginary part $Q_{ch}$ of the converted digital signals in the time domain to the FFT unit 63*c*.

The ADC units 73*a* and 73*b* supply the respective components corresponding to the real part $I_{ch}$ and the imaginary part $Q_{ch}$ of the converted digital signals in the time domain to the FFT unit 73*c*. Assume that there occurs the deviation as mentioned above between the ADC units 63*a* and 63*b* and also between the ADC units 73*a* and 73*b* for the reason described in the first embodiment. Also in the embodiment, assume that the frequency band of 40 [MHz] is sampled.

<FFT Units 63*c* and 73*c*>

The FFT unit 63*c* performs the Fourier transform on the digital signals sampled by the ADC units 63*a* and 63*b*. The FFT unit 73*c* performs the Fourier transform on the digital signals sampled by the ADC units 73*a* and 73*b*. The FFT unit 63*c* performs the Fourier transform on the digital signals of the real part $I_{ch}$ and the imaginary part $Q_{ch}$ sampled by the ADC units 63*a* and 63*b* at the timing of even number. The FFT unit 73*c* performs the Fourier transform on the digital signals of the real part I$_{ch}$ and the imaginary part Q$_{ch}$ sampled by the ADC units 73a and 73b at the timing of odd number. The FFT units 63c and 73c perform the Fourier transform on the respectively supplied digital signals for 64 points.

<Separating Circuits 63d and 73d>

The separating circuits 63d and 73d separate the digital signals converted from the time domain to the frequency domain by the FFT units 63c and 73c into the respective components corresponding to the real part I$_{ch}$ and the imaginary part Q$_{ch}$ in the time domain. The respective components corresponding to the real part I$_{ch}$ and the imaginary part Q$_{ch}$ separated by the separating circuits 63d and 73d are separated into digital signals for 64 points. The digital signals separated by the separating circuit 63d are sampled at the timing of even number, while the digital signals separated by the separating circuit 73d are sampled at the timing of odd number.

<Combining Circuits 63f and 73g>

The combining circuit 63f combines the components corresponding to the real part I$_{ch}$ in the time domain separated by the separating circuit 63d and the components corresponding to the imaginary part Q$_{ch}$ in the time domain with the above deviation corrected by the correcting unit 63g. The combining circuit 63f combines together the digital signals sampled at the timing of even number. Then, it supplies the digital signals to the butterfly calculating unit 64. The combining circuit 73g combines the components corresponding to the real part I$_{ch}$ in the time domain with the above deviation corrected by the correcting unit 73e and the components corresponding to the imaginary part Q$_{ch}$ in the time domain with the above deviation corrected by the correcting unit 73f, which are separated by the separating circuit 73d. The combining circuit 73g combines together the digital signals sampled at the timing of odd number. Then, it supplies the digital signals to the multiplying unit 66.

<Creating Unit 65, Multiplying Unit 66, and Butterfly Calculating Unit 64>

Similarly to the creating unit 53j, the multiplying unit 53i, and the butterfly calculating unit 53l in the fourth embodiment, the creating unit 65, the multiplying unit 66, and the butterfly calculating unit 64 combine the digital signals sampled at the timing of even number and the timing of odd number respectively in the ADC units 63a and 63b and in the ADC units 73a and 73b into the Fourier transform for 128 points through the calculation expressed by the expressions (30) and (31).

The creating unit 65 creates a rotation parameter depending on a point number of the data, namely depending on k, as for the digital signals supplied from the fourth receiving unit 73 and supplies it to the multiplying unit 66, similarly to the creating unit 53j of the fourth embodiment.

The multiplying unit 66 supplies the result obtained by multiplying the digital signal supplied from the fourth receiving unit 73 by the rotation parameter supplied from the creating unit 65 to the butterfly calculating unit 64, similarly to the multiplying unit 53e according to the fourth embodiment.

The adder 64a in the butterfly calculating unit 64 adds the digital signals from the third receiving unit 63 to the digital signals from the multiplying unit 66 and supplies the digital signals with the point number k less than 64, of the 128 points Fourier transform result, to the memory 67, according to the expression (30).

The subtracter 64b in the butterfly calculating unit 64 subtracts the digital signals supplied from the multiplying unit 66 from the digital signals supplied from the third receiving unit 63 and supplies the digital signals with the point number k not less than 64, of the 128 points Fourier transform result, to the memory 67, according to the expression (31).

<Memory 67>

The memory 67 supplies the digital signals supplied from the adder 64a and the subtracter 64b to the demodulator not illustrated.

<Effect>

As mentioned above, also the wireless communication device according to this embodiment can obtain the same effect as (5) described in the fourth embodiment, in addition to the effects of (1) to (4) described in the first to third embodiments.

The wireless communication device according to this embodiment can perform the double speed sampling, similarly to the above fourth embodiment. By adopting the structure of the interleave AD in the sampling using complex number, double speed sampling is enabled and according to the structure of this embodiment, a digital filter is not used, hence to reduce the circuit size.

As mentioned above, according to the wireless communication device according to the first to fifth embodiments, the whole circuit size can be reduced, especially even in a wireless communication system of broadband frequency.

Analog circuits have been often used so far in order to cope with various deviations described in the first to fifth embodiments. Use of the analog circuits, however, for correcting the deviations enlarges the whole circuit size more than necessary, hence to increase the power consumption. Especially, in the case of achieving a wireless communication using the broadband frequency, the ADC unit has difficulty in speeding up the sampling timing. In order to avoid this problem, there is a method of using the interleave AD. This can cope with the above sampling timing, but there arises such a new problem that the sampling timing deviates between the ADCs according as the frequency becomes broader band.

In order to solve this, a digital filter which is large in size and requires a lot of calculation is used to correct the deviation. According to the wireless communication device in the embodiments, however, it is not necessary for the respective ADCs in the interleave AD to correct the deviation using the analog circuits, nor for any digital filter to correct the deviation. In short, in the interleave AD, it can correct the deviation of the sampling timing between the ADCs with a small circuit size and a small power consumption.

The double speed sampling has been described in the wireless communication device according to the embodiments, by using the interleave AD. Namely, compared with the wireless communication device according to the first to third embodiments, the double number of the ADC units is provided as for one antenna for transmission and reception, hence to realize the double speed sampling. Namely, when the ADC units are provided double, the sampling speed becomes double. For example, when two more ADC units are further provided, the sampling speed becomes four times. Similarly, when the number n (n is natural number) of the ADC units is provided, the sampling speed becomes n-times.

Though the wireless communication device according to the embodiments can be applied to a wireless LAN system, it can be also applied to electric communication equipment used in public broadcasting and cell phones.

The point numbers k and k' mean the values corresponding to the 64 points digital signals and the 128 points digital signals obtained by the ADC unit sampling the analog signals received through the antennas 10 and 20. The point number is not restricted to 64 and 128 but any point number will do.

Further, the wireless communication device according to the third embodiment has the shared circuit 36 which works in a first mode of operating as the Fourier transformer by using the time division and in a second mode (mismatch correction)

of operating as a separating circuit and a correcting unit, and the memory 34 which accumulates the digital signals obtained in the converting circuits (ADC units 32a and 32b) in the first mode and accumulates the digital signals converted to the frequency domain by the shared circuit 36 in the second mode. The shared circuit 36 works in the first mode (Fourier transform) or the second mode (mismatch correction). In the first mode (Fourier transform), the digital signals obtained by the converting circuit (ADC units 32a and 32b) are supplied from the memory 34, and in the second mode (mismatch correction), the positive and negative digital signals having the same absolute value are supplied from the memory 34.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication device comprising:
   a converting circuit which converts an analog signal having an in-phase component and a quadrature component and supplied from an antenna into a digital signal having a real part and an imaginary part of complex number respectively;
   a discrete Fourier transformer which converts the real part and the imaginary part of the digital signal obtained in the converting circuit from a time domain to a frequency domain;
   a separating circuit which separates the digital signal converted to the frequency domain by the discrete Fourier transformer into a sum of a symmetrical component of the real part and an antisymmetrical component of the imaginary part of the digital signal and a sum of the antisymmetrical component of the real part and the symmetrical component of the imaginary part of the digital signal; and
   a correcting unit which corrects a value of the sum of the antisymmetrical component of the real part and the symmetrical component of the imaginary part created in the separating circuit, according to a deviation of the imaginary part from the real part at sampling timing occurring at analog-digital conversion in the converting circuit or a deviation of amplitude and phase between the real part and the imaginary part occurring across the antenna to the converting circuit.

2. The device according to claim 1, wherein a frequency band of the analog signal is 20 [MHz].

3. The device according to claim 1, wherein the converting circuit converts a plurality of the analog signals into a plurality of the digital signals,
   the discrete Fourier transformer converts the digital signals into the frequency domain,
   the separating circuit performs the separation on the digital signals converted into the frequency domain,
   the digital signal includes a first digital signal and a second digital signal, and
   the correcting unit corrects the sum of the antisymmetrical component of the real part and the symmetrical component of the imaginary part of the first digital signal, according to a deviation of the real part from the imaginary part in the first digital signal,
   corrects the sum of the symmetrical component of the real part and the antisymmetrical component of the imaginary part of the second digital signal, according to a deviation of the real part of the second digital signal from the real part of the first digital signal, and
   corrects the sum of the antisymmetrical component of the real part and the symmetrical component of the imaginary part of the second digital signal, according to a deviation of the imaginary part of the second digital signal from the real part of the first digital signal.

4. The device according to claim 1, wherein the sum of the symmetrical component of the real part and the antisymmetrical component of the imaginary part is a frequency component corresponding to the in-phase component of the analog signal, and the sum of the antisymmetrical component of the real part and the symmetrical component of the imaginary part is a frequency component corresponding to the quadrature component of the analog signal.

5. The device according to claim 1, further comprising:
   a shared circuit which has a first mode of working as the discrete Fourier transformer using time division and a second mode of working as the separating circuit and the correcting unit;
   a memory which accumulates the digital signal obtained by the converting circuit in the first mode and accumulates the digital signal converted into the frequency domain by the shared circuit in the second mode; and
   a controlling unit which controls the shared circuit to work in the first mode or the second mode, to output the digital signal obtained by the converting circuit from the memory in the first mode, and to output a plurality of positive and negative digital signals having the same absolute value in the frequency domain from the memory in the second mode.

6. The device according to claim 5, wherein the controlling unit switches the shared circuit into the second mode, when confirming that the digital signal obtained by the converting circuit is Fourier operated in the shared circuit working in the first mode.

7. The device according to claim 1, wherein the converting circuit includes a first converting circuit and a second converting circuit, and the first converting circuit and the second converting circuit alternately convert the analog signal to the digital signal.

8. The device according to claim 1, which performs wireless communication using OFDM modulation.

9. A wireless communication device comprising:
   a separating circuit which separates a digital signal including a real part component and an imaginary part component of complex number in a frequency domain into a sum of the symmetrical component of the real part and the antisymmetrical component of the imaginary part of the digital signal and a sum of the antisymmetrical component of the real part and the symmetrical component of the imaginary part of the digital signal;
   a correcting unit which corrects a value of the sum of the antisymmetrical component of the real part and the symmetrical component of the imaginary part created in the separating circuit;
   a combining circuit which combines the sum of the antisymmetrical component of the real part and the symmetrical component of the imaginary part corrected by the correcting unit and the sum of the symmetrical component of the real part and the antisymmetrical component of the imaginary part;
   an inverse Fourier transformer which converts the digital signal obtained as a result of combination in the combining circuit from a frequency domain to a time domain; and a converting circuit which converts the digital signal having the real part and the imaginary part and converted in the inverse Fourier transformer into an analog signal having an in-phase component and a quadrature component respectively, the analog signal being transmitted from an antenna and the correcting unit performing a correction according to a deviation of output timing of the quadrature component from the in-phase component occurring at conversion in the converting circuit or a deviation of amplitude and phase between the real part and the imaginary part occurring across the antenna and the converting circuit.

10. The device according to claim 9, wherein a frequency band of the analog signal is 20 [MHz].

11. The device according to claim 9, wherein the sum of the symmetrical component of the real part and the antisymmetrical component of the imaginary part is a frequency component corresponding to the in-phase component of the analog signal and the sum of the antisymmetrical component of the real part and the symmetrical component of the imaginary part is a frequency component corresponding to the quadrature component of the analog signal.

12. The device according to claim 9, further comprising:
a shared circuit which has a first mode of working as the discrete Fourier transformer using time division and a second mode of working as the separating circuit and the correcting unit;
a memory which accumulates the digital signal obtained by the converting circuit in the first mode and accumulates the digital signal converted into the frequency domain by the shared circuit in the second mode; and
a controlling unit which controls the shared circuit to work in the first mode or the second mode, to output the digital signal obtained by the converting circuit from the memory in the first mode, and to output a plurality of positive and negative digital signals having the same absolute value in the frequency domain from the memory in the second mode.

13. The device according to claim 9, wherein the controlling unit switches the shared circuit into the second mode, when confirming that the digital signal obtained by the converting circuit is Fourier operated in the shared circuit working in the first mode.

14. A method of communication of a wireless communication device, comprising:
converting an analog signal having an in-phase component and a quadrature component and supplied through an antenna into a digital signal having a real part and an imaginary part of complex number respectively in a converting circuit;
converting the real part and the imaginary part of the digital signal obtained by the converting circuit from a time domain to a frequency domain in a discrete Fourier transformer;
separating the digital signal converted to a frequency domain by the discrete Fourier transformer into a sum of a symmetrical component of the real part and an antisymmetrical component of the imaginary part of the digital signal and a sum of the antisymmetrical component of the real part and the symmetrical component of the imaginary part, in a separating circuit; and
correcting the sum of the antisymmetrical component of the real part and the symmetrical component of the imaginary part created by the separating circuit, according to a deviation of the imaginary part from the real part at sampling timing occurring at analog-digital conversion in the converting circuit or a deviation of amplitude and phase between the real part and the imaginary part occurring across the antenna and the converting circuit, in a correcting unit.

15. The method according to claim 14, wherein a frequency band of the analog signal is 20 [MHz].

16. The method according to claim 14, wherein the converting circuit obtains a plurality of the digital signals including a first digital signal and a second digital signal by performing conversion from a plurality of the analog signals to the digital signals,
the discrete Fourier transformer converts the digital signals into the frequency domain,
the separating circuit performs the separation on the digital signals converted into the frequency domain, and
the correcting unit corrects the sum of the antisymmetrical component of the real part and the symmetrical component of the imaginary part of the first digital signal, according to a deviation of the real part from the imaginary part of the first digital signal,
corrects the sum of the symmetrical component of the real part and the antisymmetrical component of the imaginary part of the second digital signal, according to a deviation of the real part of the second digital signal from the real part of the first digital signal, and
corrects the sum of the antisymmetrical component of the real part and the symmetrical component of the imaginary part of the second digital signal, according to a deviation of the imaginary part of the second digital signal from the real part of the first digital signal.

17. The method according to claim 14, wherein the sum of the symmetrical component of the real part and the antisymmetrical component of the imaginary part is a frequency component corresponding to the in-phase component of the analog signal and the sum of the antisymmetrical component of the real part and the symmetrical component of the imaginary part is the frequency component corresponding to the quadrature component of the analog signal.

18. The method according to claim 14, wherein a shared circuit has a first mode working as the discrete Fourier transformer using time division and a second mode working as the separating unit and the correcting unit,
a memory stores the digital signal obtained in the converting circuit in the first mode and stores the digital signal converted into the frequency domain by the shared circuit in the second mode, and
the controlling unit controls the shared circuit to work in the first mode or the second mode, to output the digital signal obtained by the converting circuit from the memory in the first mode, and to output a plurality of positive and negative digital signals having the same absolute value in the frequency domain from the memory in the second mode.

19. The method according to claim 14, wherein the controlling unit switches the shared circuit into the second mode, when confirming that the digital signal obtained by the converting circuit is Fourier-operated, in the shared circuit working in the first mode.

20. The method according to claim 14, wherein the converting circuit includes a first converting circuit and a second converting circuit, and the first converting circuit and the second converting circuit alternately convert the analog signal into the digital signal.

* * * * *